(12) United States Patent
Ripumaree et al.

(10) Patent No.: US 11,487,073 B2
(45) Date of Patent: Nov. 1, 2022

(54) CABLE INPUT DEVICES HAVING AN INTEGRATED LOCKING FEATURE AND ASSEMBLIES USING THE CABLE INPUT DEVICES

(71) Applicant: Corning Research & Development Corporation, Corning, NY (US)

(72) Inventors: Radawan Ripumaree, Hickory, NC (US); Joel Christopher Rosson, Hickory, NC (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 17/032,909

(22) Filed: Sep. 25, 2020

(65) Prior Publication Data
US 2021/0096317 A1    Apr. 1, 2021

Related U.S. Application Data

(60) Provisional application No. 62/908,218, filed on Sep. 30, 2019.

(51) Int. Cl.
*G02B 6/44* (2006.01)
(52) U.S. Cl.
CPC ......... *G02B 6/4471* (2013.01); *G02B 6/4446* (2013.01)
(58) Field of Classification Search
CPC ....... G02B 6/4471; G02B 6/4446; G02B 6/44
See application file for complete search history.

(56) References Cited

U.S. PATENT DOCUMENTS

| | | |
|---|---|---|
| 3,792,284 A | 2/1974 | Kaelin |
| 4,148,557 A | 4/1979 | Garvey |
| 4,413,880 A | 11/1983 | Forrest et al. |
| 4,547,937 A | 10/1985 | Collins |
| 4,615,581 A | 10/1986 | Morimoto |
| 4,634,858 A | 1/1987 | Gerdt et al. |
| 4,688,200 A | 8/1987 | Poorman et al. |
| 4,723,827 A | 2/1988 | Shaw et al. |
| 4,979,792 A | 12/1990 | Weber et al. |
| 5,007,860 A | 4/1991 | Robinson et al. |
| 5,067,783 A | 11/1991 | Lampert |
| 5,073,042 A | 12/1991 | Mulholland et al. |

(Continued)

FOREIGN PATENT DOCUMENTS

| | | |
|---|---|---|
| AU | 2006232206 A1 | 10/2006 |
| CN | 1060911 A | 5/1992 |

(Continued)

OTHER PUBLICATIONS

Coaxum, L., et al., U.S. Appl. No. 62/341,947, "Fiber Optic Multiport Having Different Types of Ports for Multi-Use," filed May 26, 2016.

(Continued)

*Primary Examiner* — Jennifer Doan
(74) *Attorney, Agent, or Firm* — Michael E. Carroll, Jr.

(57) ABSTRACT

Cable input devices having an integrated locking feature for securing the cable input device in a port of another device such as useful for quickly attaching a tether cable to a terminal or the like. The cable input devices comprise a housing having an integrated locking feature that can be secured in a port by cooperating with a securing member of the terminal.

34 Claims, 10 Drawing Sheets

(56) References Cited

U.S. PATENT DOCUMENTS

| | | |
|---|---|---|
| 5,131,735 A | 7/1992 | Berkey et al. |
| 5,146,519 A | 9/1992 | Miller et al. |
| 5,162,397 A | 11/1992 | Descamps et al. |
| 5,210,810 A | 5/1993 | Darden et al. |
| 5,212,752 A | 5/1993 | Stephenson et al. |
| 5,263,239 A | 11/1993 | Ziemek |
| 5,317,663 A | 5/1994 | Beard et al. |
| 5,381,494 A | 1/1995 | O'Donnell et al. |
| 5,408,570 A | 4/1995 | Cook et al. |
| 5,519,799 A | 5/1996 | Murakami et al. |
| 5,553,186 A | 9/1996 | Allen |
| 5,569,050 A | 10/1996 | Lloyd |
| 5,600,747 A | 2/1997 | Yamakawa et al. |
| 5,631,993 A | 5/1997 | Cloud et al. |
| 5,647,045 A | 7/1997 | Robinson et al. |
| 5,673,346 A | 9/1997 | Iwano et al. |
| 5,748,821 A | 5/1998 | Schempp et al. |
| 5,781,686 A | 7/1998 | Robinson et al. |
| 5,782,892 A | 7/1998 | Castle et al. |
| 5,791,918 A | 8/1998 | Pierce |
| 5,796,895 A | 8/1998 | Jennings et al. |
| 5,862,290 A | 1/1999 | Burek |
| 5,960,141 A | 9/1999 | Sasaki et al. |
| 5,961,344 A | 10/1999 | Rosales et al. |
| 6,045,270 A | 4/2000 | Weiss et al. |
| 6,108,482 A | 8/2000 | Roth |
| 6,112,006 A | 8/2000 | Foss |
| 6,179,482 B1 | 1/2001 | Takizawa et al. |
| 6,206,581 B1 | 3/2001 | Driscoll et al. |
| 6,321,013 B1 | 11/2001 | Hardwick et al. |
| 6,356,390 B1 | 3/2002 | Hall, Jr. |
| 6,375,363 B1 | 4/2002 | Harrison et al. |
| 6,404,962 B1 | 6/2002 | Hardwick et al. |
| 6,409,391 B1 | 6/2002 | Chang |
| 6,427,035 B1 | 7/2002 | Mahony |
| 6,466,725 B2 | 10/2002 | Battey et al. |
| 6,496,641 B1 | 12/2002 | Mahony |
| 6,522,804 B1 | 2/2003 | Mahony |
| 6,536,956 B2 | 3/2003 | Luther et al. |
| 6,554,489 B2 | 4/2003 | Kent et al. |
| 6,625,375 B1 | 9/2003 | Mahony |
| 6,629,782 B2 | 10/2003 | McPhee et al. |
| 6,672,774 B2 | 1/2004 | Theuerkorn et al. |
| 6,678,442 B2 | 1/2004 | Gall et al. |
| 6,702,475 B1 | 3/2004 | Giobbio et al. |
| 6,738,555 B1 | 5/2004 | Cooke et al. |
| 6,748,146 B2 | 6/2004 | Parris |
| 6,771,861 B2 | 8/2004 | Wagner et al. |
| 6,789,950 B1 | 9/2004 | Loder et al. |
| 6,856,748 B1 | 2/2005 | Elkins et al. |
| 6,916,120 B2 | 7/2005 | Zimmel et al. |
| 6,918,704 B2 * | 7/2005 | Marrs ............... G02B 6/3843 385/53 |
| 6,944,387 B2 | 9/2005 | Howell et al. |
| 6,962,445 B2 | 11/2005 | Zimmel et al. |
| 7,120,347 B2 | 10/2006 | Blackwell et al. |
| 7,150,567 B1 | 12/2006 | Luther et al. |
| 7,201,518 B2 | 4/2007 | Holmquist |
| 7,213,975 B2 | 5/2007 | Khemakhem et al. |
| 7,228,047 B1 | 6/2007 | Szilagyi et al. |
| 7,266,265 B2 | 9/2007 | Gall et al. |
| 7,277,614 B2 | 10/2007 | Cody et al. |
| 7,302,152 B2 | 11/2007 | Luther et al. |
| 7,330,629 B2 | 2/2008 | Cooke et al. |
| 7,333,708 B2 | 2/2008 | Blackwell et al. |
| 7,341,382 B2 | 3/2008 | Dye |
| 7,346,256 B2 | 3/2008 | Marrs et al. |
| 7,366,416 B2 | 4/2008 | Ramachandran et al. |
| 7,444,056 B2 | 10/2008 | Allen et al. |
| 7,463,803 B2 | 12/2008 | Cody et al. |
| 7,489,849 B2 | 2/2009 | Reagan et al. |
| 7,512,304 B2 | 3/2009 | Gronvall et al. |
| 7,542,645 B1 | 6/2009 | Hua et al. |
| 7,565,055 B2 | 7/2009 | Lu et al. |
| 7,614,797 B2 | 11/2009 | Lu et al. |
| 7,621,675 B1 | 11/2009 | Bradley |
| 7,627,222 B2 | 12/2009 | Reagan et al. |
| 7,628,545 B2 | 12/2009 | Cody et al. |
| 7,628,548 B2 | 12/2009 | Benjamin et al. |
| 7,653,282 B2 | 1/2010 | Blackwell et al. |
| 7,654,747 B2 | 2/2010 | Theuerkorn et al. |
| 7,680,388 B2 | 3/2010 | Reagan et al. |
| 7,708,476 B2 | 5/2010 | Liu |
| 7,709,733 B1 | 5/2010 | Plankell |
| 7,712,971 B2 | 5/2010 | Lee et al. |
| 7,740,409 B2 | 6/2010 | Bolton et al. |
| 7,742,117 B2 | 6/2010 | Lee et al. |
| 7,742,670 B2 | 6/2010 | Benjamin et al. |
| 7,753,596 B2 | 7/2010 | Cox |
| 7,762,726 B2 | 7/2010 | Lu et al. |
| 7,806,599 B2 | 10/2010 | Margolin et al. |
| 7,844,160 B2 | 11/2010 | Reagan et al. |
| RE42,094 E | 2/2011 | Barnes et al. |
| 7,903,923 B2 | 3/2011 | Gronvall et al. |
| 7,903,925 B2 | 3/2011 | Cooke et al. |
| 7,933,517 B2 | 4/2011 | Ye et al. |
| 8,025,445 B2 | 9/2011 | Rambow et al. |
| 8,213,761 B2 | 7/2012 | Gronvall et al. |
| 8,218,935 B2 | 7/2012 | Reagan et al. |
| 8,229,263 B2 | 7/2012 | Parris et al. |
| 8,238,706 B2 | 8/2012 | Kachmar |
| 8,267,596 B2 | 9/2012 | Theuerkorn |
| RE43,762 E | 10/2012 | Smith et al. |
| 8,301,003 B2 | 10/2012 | De et al. |
| 8,301,004 B2 | 10/2012 | Cooke et al. |
| 8,376,629 B2 | 2/2013 | Cline et al. |
| 8,408,811 B2 | 4/2013 | De et al. |
| 8,466,262 B2 | 6/2013 | Siadak et al. |
| 8,472,773 B2 | 6/2013 | De Jong |
| 8,480,312 B2 | 7/2013 | Smith et al. |
| 8,520,996 B2 | 8/2013 | Cowen et al. |
| 8,534,928 B2 | 9/2013 | Cooke et al. |
| 8,556,522 B2 | 10/2013 | Cunningham |
| 8,622,634 B2 | 1/2014 | Arnold et al. |
| 8,662,760 B2 | 3/2014 | Cline et al. |
| 8,678,668 B2 | 3/2014 | Cooke et al. |
| 8,687,930 B2 | 4/2014 | McDowell et al. |
| 8,727,638 B2 | 5/2014 | Lee et al. |
| 8,737,837 B2 | 5/2014 | Conner et al. |
| 8,755,663 B2 | 6/2014 | Makrides-Saravanos et al. |
| 8,758,046 B2 | 6/2014 | Pezzetti et al. |
| 8,770,861 B2 | 7/2014 | Smith et al. |
| 8,870,469 B2 | 10/2014 | Kachmar |
| 8,882,364 B2 | 11/2014 | Busse et al. |
| 8,917,966 B2 | 12/2014 | Thompson et al. |
| 8,944,703 B2 * | 2/2015 | Song ............... G02B 6/3846 385/83 |
| 8,992,097 B2 | 3/2015 | Koreeda et al. |
| 8,998,502 B2 | 4/2015 | Benjamin et al. |
| 9,158,074 B2 | 10/2015 | Anderson et al. |
| 9,158,075 B2 | 10/2015 | Benjamin et al. |
| 9,182,567 B2 | 11/2015 | Mullaney |
| 9,207,410 B2 | 12/2015 | Lee et al. |
| 9,285,550 B2 | 3/2016 | Nhep et al. |
| 9,297,974 B2 | 3/2016 | Valderrabano et al. |
| 9,310,570 B2 | 4/2016 | Busse et al. |
| 9,322,998 B2 | 4/2016 | Miller |
| 9,383,539 B2 | 7/2016 | Hill et al. |
| 9,405,068 B2 | 8/2016 | Graham et al. |
| 9,435,969 B2 | 9/2016 | Lambourn et al. |
| 9,442,257 B2 | 9/2016 | Lu |
| 9,450,393 B2 | 9/2016 | Thompson et al. |
| 9,482,819 B2 | 11/2016 | Li et al. |
| 9,535,229 B2 | 1/2017 | Ott et al. |
| 9,541,711 B2 | 1/2017 | Raven et al. |
| 9,618,704 B2 | 4/2017 | Dean et al. |
| 9,618,718 B2 | 4/2017 | Islam |
| 9,638,871 B2 | 5/2017 | Bund et al. |
| 9,645,331 B1 | 5/2017 | Kim |
| 9,651,741 B2 | 5/2017 | Isenhour et al. |
| 9,664,862 B2 | 5/2017 | Lu et al. |
| 9,684,136 B2 | 6/2017 | Cline et al. |
| 9,684,138 B2 | 6/2017 | Lu |
| 9,696,500 B2 | 7/2017 | Barnette et al. |

(56) References Cited

U.S. PATENT DOCUMENTS

| | | |
|---|---|---|
| 9,739,951 B2 | 8/2017 | Busse et al. |
| 9,762,322 B1 | 9/2017 | Amundson |
| 9,766,416 B1 | 9/2017 | Kim |
| 9,772,457 B2 | 9/2017 | Hill et al. |
| 9,810,855 B2 | 11/2017 | Cox et al. |
| 9,810,856 B2 | 11/2017 | Graham et al. |
| 9,829,668 B2 | 11/2017 | Coenegracht et al. |
| 9,857,540 B2 | 1/2018 | Ahmed et al. |
| 9,864,151 B2 | 1/2018 | Lu |
| 9,891,391 B2 | 2/2018 | Watanabe |
| 9,910,236 B2 | 3/2018 | Cooke et al. |
| 9,933,582 B1 | 4/2018 | Lin |
| 9,964,715 B2 | 5/2018 | Lu |
| 9,983,374 B2 | 5/2018 | Li et al. |
| 10,031,302 B2 | 7/2018 | Ji et al. |
| 10,038,946 B2 | 7/2018 | Smolorz |
| 10,061,090 B2 | 8/2018 | Coenegracht |
| 10,073,224 B2 | 9/2018 | Tong et al. |
| 10,114,176 B2 | 10/2018 | Gimblet et al. |
| 10,209,454 B2 | 2/2019 | Isenhour et al. |
| 10,235,184 B2 | 3/2019 | Walker |
| 10,261,268 B2 | 4/2019 | Theuerkorn |
| 10,268,011 B2 | 4/2019 | Courchaine et al. |
| 10,288,820 B2 | 5/2019 | Coenegracht |
| 10,353,154 B2 | 7/2019 | Ott et al. |
| 10,353,156 B2 | 7/2019 | Hill et al. |
| 10,359,577 B2 | 7/2019 | Dannoux et al. |
| 10,401,575 B2 | 9/2019 | Daily et al. |
| 10,401,578 B2 | 9/2019 | Coenegracht |
| 10,409,007 B2 | 9/2019 | Kadar-Kallen et al. |
| 10,422,962 B2 | 9/2019 | Coenegracht |
| 10,444,442 B2 | 10/2019 | Takano et al. |
| 10,451,817 B2 | 10/2019 | Lu |
| 10,451,830 B2 | 10/2019 | Szumacher et al. |
| 10,488,597 B2 | 11/2019 | Parikh et al. |
| 10,495,822 B2 | 12/2019 | Nhep |
| 10,520,683 B2 | 12/2019 | Nhep |
| 10,578,821 B2 | 3/2020 | Ott et al. |
| 10,606,006 B2 | 3/2020 | Hill et al. |
| 10,613,278 B2 | 4/2020 | Kempeneers et al. |
| 10,656,347 B2 | 5/2020 | Kato |
| 10,712,516 B2 | 7/2020 | Ne et al. |
| 10,739,534 B2 | 8/2020 | Murray et al. |
| 10,782,487 B2 | 9/2020 | Lu |
| 10,802,236 B2 | 10/2020 | Kowalczyk et al. |
| 10,830,967 B2 | 11/2020 | Pimentel et al. |
| 10,830,975 B2 | 11/2020 | Vaughn et al. |
| 10,852,498 B2 | 12/2020 | Hill et al. |
| 10,852,499 B2 | 12/2020 | Cooke et al. |
| 10,859,771 B2 | 12/2020 | Nhep |
| 10,859,781 B2 | 12/2020 | Hill et al. |
| 10,962,731 B2 | 3/2021 | Coenegracht |
| 10,976,500 B2 | 4/2021 | Ott et al. |
| 11,061,191 B2 | 7/2021 | Van Baelen et al. |
| 11,290,188 B2 | 3/2022 | Tuccio et al. |
| 2002/0012502 A1 | 1/2002 | Farrar et al. |
| 2002/0064364 A1 | 5/2002 | Battey et al. |
| 2002/0081077 A1 | 6/2002 | Nault |
| 2002/0131721 A1 | 9/2002 | Gaio et al. |
| 2003/0063866 A1 | 4/2003 | Melton et al. |
| 2004/0072454 A1 | 4/2004 | Nakajima et al. |
| 2004/0076377 A1 | 4/2004 | Mizukami et al. |
| 2004/0076386 A1 | 4/2004 | Nechitailo |
| 2004/0096162 A1 | 5/2004 | Kocher et al. |
| 2004/0157499 A1 | 8/2004 | Nania et al. |
| 2004/0223699 A1* | 11/2004 | Melton .......... G02B 6/387 385/100 |
| 2004/0240808 A1 | 12/2004 | Rhoney et al. |
| 2004/0252954 A1 | 12/2004 | Ginocchio et al. |
| 2005/0019031 A1 | 1/2005 | Ye et al. |
| 2005/0036786 A1 | 2/2005 | Ramachandran et al. |
| 2005/0084215 A1 | 4/2005 | Grzegorzewska et al. |
| 2005/0129379 A1 | 6/2005 | Reagan et al. |
| 2005/0175307 A1 | 8/2005 | Battey et al. |
| 2005/0213902 A1 | 9/2005 | Parsons |
| 2005/0232552 A1 | 10/2005 | Takahashi et al. |
| 2005/0271344 A1 | 12/2005 | Grubish et al. |
| 2005/0281510 A1 | 12/2005 | Vo et al. |
| 2005/0281514 A1 | 12/2005 | Oki et al. |
| 2006/0045430 A1 | 3/2006 | Theuerkorn et al. |
| 2006/0088247 A1 | 4/2006 | Tran et al. |
| 2006/0093278 A1 | 5/2006 | Elkins et al. |
| 2006/0093303 A1 | 5/2006 | Reagan et al. |
| 2006/0120672 A1 | 6/2006 | Cody et al. |
| 2006/0127016 A1 | 6/2006 | Baird et al. |
| 2006/0133758 A1 | 6/2006 | Mullaney et al. |
| 2006/0133759 A1 | 6/2006 | Mullaney et al. |
| 2006/0147172 A1 | 7/2006 | Luther et al. |
| 2006/0153503 A1 | 7/2006 | Suzuki et al. |
| 2006/0153517 A1 | 7/2006 | Reagan et al. |
| 2006/0171638 A1 | 8/2006 | Dye |
| 2006/0269204 A1 | 11/2006 | Barth et al. |
| 2006/0269208 A1 | 11/2006 | Allen et al. |
| 2006/0280420 A1 | 12/2006 | Blackwell et al. |
| 2007/0031100 A1 | 2/2007 | Garcia et al. |
| 2007/0036483 A1 | 2/2007 | Shin et al. |
| 2008/0020532 A1 | 1/2008 | Monfray et al. |
| 2008/0080817 A1 | 4/2008 | Melton et al. |
| 2008/0138016 A1 | 6/2008 | Katagiyama et al. |
| 2008/0175542 A1 | 7/2008 | Lu et al. |
| 2008/0175544 A1 | 7/2008 | Fujiwara et al. |
| 2008/0175548 A1 | 7/2008 | Knecht et al. |
| 2008/0232743 A1 | 9/2008 | Gronvall et al. |
| 2008/0264664 A1 | 10/2008 | Dinh et al. |
| 2008/0273837 A1 | 11/2008 | Margolin et al. |
| 2009/0060421 A1 | 3/2009 | Parikh et al. |
| 2009/0148101 A1 | 6/2009 | Lu et al. |
| 2009/0148104 A1 | 6/2009 | Lu et al. |
| 2009/0156041 A1 | 6/2009 | Radle |
| 2009/0185835 A1 | 7/2009 | Park et al. |
| 2009/0245743 A1 | 10/2009 | Cote et al. |
| 2009/0263097 A1 | 10/2009 | Solheid et al. |
| 2009/0317039 A1 | 12/2009 | Blazer et al. |
| 2010/0008909 A1 | 1/2010 | Siadak et al. |
| 2010/0014813 A1 | 1/2010 | Ito et al. |
| 2010/0014867 A1 | 1/2010 | Ramanitra et al. |
| 2010/0015834 A1 | 1/2010 | Siebens |
| 2010/0040338 A1 | 2/2010 | Sek |
| 2010/0074578 A1 | 3/2010 | Imaizumi et al. |
| 2010/0092136 A1 | 4/2010 | Nhep |
| 2010/0172616 A1 | 7/2010 | Lu et al. |
| 2010/0197222 A1 | 8/2010 | Scheucher |
| 2010/0232753 A1 | 9/2010 | Parris et al. |
| 2010/0247053 A1 | 9/2010 | Cowen et al. |
| 2010/0266245 A1 | 10/2010 | Sabo |
| 2010/0272399 A1 | 10/2010 | Griffiths et al. |
| 2010/0303426 A1 | 12/2010 | Davis |
| 2010/0310213 A1 | 12/2010 | Lewallen et al. |
| 2011/0019964 A1 | 1/2011 | Nhep et al. |
| 2011/0047731 A1 | 3/2011 | Sugita et al. |
| 2011/0069932 A1 | 3/2011 | Overton et al. |
| 2011/0108719 A1 | 5/2011 | Ford et al. |
| 2011/0129186 A1 | 6/2011 | Lewallen et al. |
| 2011/0164854 A1 | 7/2011 | Desard et al. |
| 2011/0262099 A1 | 10/2011 | Castonguay et al. |
| 2011/0299814 A1 | 12/2011 | Nakagawa |
| 2012/0008909 A1 | 1/2012 | Mertesdorf et al. |
| 2012/0106912 A1 | 5/2012 | McGranahan et al. |
| 2012/0183268 A1 | 7/2012 | De et al. |
| 2012/0251060 A1 | 10/2012 | Hurley |
| 2012/0251063 A1 | 10/2012 | Reagan et al. |
| 2012/0252244 A1 | 10/2012 | Elkins et al. |
| 2013/0004122 A1 | 1/2013 | Kingsbury |
| 2013/0034333 A1 | 2/2013 | Holmberg et al. |
| 2013/0064506 A1 | 3/2013 | Eberle et al. |
| 2013/0094821 A1 | 4/2013 | Logan |
| 2013/0109213 A1 | 5/2013 | Chang |
| 2013/0170834 A1 | 7/2013 | Cho et al. |
| 2013/0236139 A1 | 9/2013 | Chen et al. |
| 2014/0016902 A1 | 1/2014 | Pepe et al. |
| 2014/0079356 A1 | 3/2014 | Pepin et al. |
| 2014/0133806 A1 | 5/2014 | Hill et al. |
| 2014/0133807 A1 | 5/2014 | Katoh |
| 2014/0153876 A1 | 6/2014 | Dendas et al. |

(56) References Cited

U.S. PATENT DOCUMENTS

| | | |
|---|---|---|
| 2014/0161397 A1 | 6/2014 | Gallegos et al. |
| 2014/0205257 A1 | 7/2014 | Durrant et al. |
| 2014/0219609 A1 | 8/2014 | Nielson et al. |
| 2014/0219622 A1 | 8/2014 | Coan et al. |
| 2014/0233896 A1 | 8/2014 | Ishigami et al. |
| 2014/0241671 A1 | 8/2014 | Koreeda et al. |
| 2014/0241689 A1 | 8/2014 | Bradley et al. |
| 2014/0294395 A1 | 10/2014 | Waldron et al. |
| 2014/0328559 A1 | 11/2014 | Kobayashi et al. |
| 2014/0348467 A1 | 11/2014 | Cote et al. |
| 2014/0355936 A1 | 12/2014 | Bund et al. |
| 2015/0003788 A1 | 1/2015 | Chen et al. |
| 2015/0036982 A1 | 2/2015 | Nhep et al. |
| 2015/0110451 A1 | 4/2015 | Blazer et al. |
| 2015/0185423 A1 | 7/2015 | Matsui et al. |
| 2015/0253528 A1 | 9/2015 | Corbille et al. |
| 2015/0268423 A1 | 9/2015 | Burkholder et al. |
| 2015/0268434 A1 | 9/2015 | Barnette et al. |
| 2015/0293310 A1 | 10/2015 | Kanno |
| 2015/0309274 A1 | 10/2015 | Hurley et al. |
| 2015/0316727 A1 | 11/2015 | Kondo et al. |
| 2015/0346435 A1 | 12/2015 | Kato |
| 2015/0346436 A1 | 12/2015 | Pepe et al. |
| 2016/0015885 A1 | 1/2016 | Pananen et al. |
| 2016/0126667 A1 | 5/2016 | Droesbeke et al. |
| 2016/0131851 A1 | 5/2016 | Theuerkorn |
| 2016/0131857 A1 | 5/2016 | Pimentel et al. |
| 2016/0139346 A1 | 5/2016 | Bund et al. |
| 2016/0161688 A1 | 6/2016 | Nishimura |
| 2016/0161689 A1 | 6/2016 | Nishimura |
| 2016/0209599 A1 | 7/2016 | Van et al. |
| 2016/0216468 A1 | 7/2016 | Gimblet et al. |
| 2016/0238810 A1 | 8/2016 | Hubbard et al. |
| 2016/0246019 A1 | 8/2016 | Ishii et al. |
| 2016/0259133 A1 | 9/2016 | Kobayashi et al. |
| 2016/0306122 A1 | 10/2016 | Tong et al. |
| 2017/0131509 A1 | 5/2017 | Xiao et al. |
| 2017/0139158 A1 | 5/2017 | Coenegracht |
| 2017/0168248 A1 | 6/2017 | Hayauchi et al. |
| 2017/0170596 A1 | 6/2017 | Goossens et al. |
| 2017/0176252 A1 | 6/2017 | Marple et al. |
| 2017/0176690 A1 | 6/2017 | Bretz et al. |
| 2017/0219782 A1 | 8/2017 | Nishimura |
| 2017/0238822 A1 | 8/2017 | Young et al. |
| 2017/0254961 A1 | 9/2017 | Kamada et al. |
| 2017/0254962 A1 | 9/2017 | Mueller-Schlomka et al. |
| 2017/0261699 A1 | 9/2017 | Compton et al. |
| 2017/0343745 A1 | 11/2017 | Rosson |
| 2017/0351037 A1 | 12/2017 | Watanabe et al. |
| 2018/0081127 A1 | 3/2018 | Coenegracht |
| 2018/0180831 A1 | 6/2018 | Blazer et al. |
| 2019/0004251 A1 | 1/2019 | Dannoux et al. |
| 2019/0004256 A1 | 1/2019 | Rosson |
| 2019/0004258 A1 | 1/2019 | Dannoux et al. |
| 2019/0147202 A1 | 5/2019 | Harney |
| 2019/0162910 A1 | 5/2019 | Gurreri |
| 2019/0187396 A1 | 6/2019 | Finnegan et al. |
| 2020/0049922 A1 | 2/2020 | Rosson |
| 2020/0057205 A1 | 2/2020 | Dannoux et al. |
| 2020/0057222 A1 | 2/2020 | Dannoux et al. |
| 2020/0057224 A1 | 2/2020 | Dannoux et al. |
| 2020/0057723 A1 | 2/2020 | Chirca et al. |
| 2020/0103608 A1 | 4/2020 | Johnson et al. |
| 2020/0110229 A1 | 4/2020 | Dannoux et al. |
| 2020/0116952 A1 | 4/2020 | Rosson |
| 2020/0116953 A1 | 4/2020 | Rosson |
| 2020/0116958 A1 | 4/2020 | Dannoux et al. |
| 2020/0124812 A1 | 4/2020 | Dannoux et al. |
| 2020/0241211 A1 | 7/2020 | Shonkwiler et al. |
| 2020/0348476 A1 | 11/2020 | Hill et al. |
| 2020/0371306 A1 | 11/2020 | Mosier et al. |
| 2020/0393629 A1 | 12/2020 | Hill et al. |

FOREIGN PATENT DOCUMENTS

| | | |
|---|---|---|
| CN | 1071012 A | 4/1993 |
| CN | 1213783 A | 4/1999 |
| CN | 1114839 C | 7/2003 |
| CN | 1646962 A | 7/2005 |
| CN | 1833188 A | 9/2006 |
| CN | 1922523 A | 2/2007 |
| CN | 1985205 A | 6/2007 |
| CN | 101084461 A | 12/2007 |
| CN | 101111790 A | 1/2008 |
| CN | 101195453 A | 6/2008 |
| CN | 101846773 A | 9/2010 |
| CN | 101939680 A | 1/2011 |
| CN | 201704194 U | 1/2011 |
| CN | 102346281 A | 2/2012 |
| CN | 202282523 U | 6/2012 |
| CN | 203224645 U | 10/2013 |
| CN | 203396982 U | 1/2014 |
| CN | 103713362 A | 4/2014 |
| CN | 104064903 A | 9/2014 |
| CN | 104280830 A | 1/2015 |
| CN | 104603656 A | 5/2015 |
| CN | 105467529 A | 4/2016 |
| CN | 105492946 A | 4/2016 |
| CN | 106716205 A | 5/2017 |
| CN | 106873086 A | 6/2017 |
| EP | 0244791 A2 | 11/1987 |
| EP | 0547788 A1 | 6/1993 |
| EP | 0782025 A1 | 7/1997 |
| EP | 0856751 A1 | 8/1998 |
| EP | 0957381 A1 | 11/1999 |
| EP | 1243957 A2 | 9/2002 |
| EP | 1391762 A1 | 2/2004 |
| EP | 1431786 A2 | 6/2004 |
| EP | 1438622 A2 | 7/2004 |
| EP | 1678537 A1 | 7/2006 |
| EP | 1759231 A1 | 3/2007 |
| EP | 1810062 A1 | 7/2007 |
| EP | 2069845 A2 | 6/2009 |
| EP | 2149063 A1 | 2/2010 |
| EP | 2150847 A1 | 2/2010 |
| EP | 2193395 A1 | 6/2010 |
| EP | 2255233 A1 | 12/2010 |
| EP | 2333597 A2 | 6/2011 |
| EP | 2362253 A1 | 8/2011 |
| EP | 2401641 A1 | 1/2012 |
| EP | 2609458 A1 | 7/2013 |
| EP | 2622395 A1 | 8/2013 |
| EP | 2734879 A1 | 5/2014 |
| EP | 2815259 A1 | 12/2014 |
| EP | 2817667 A1 | 12/2014 |
| EP | 2992372 A1 | 3/2016 |
| EP | 3022596 A1 | 5/2016 |
| EP | 3064973 A2 | 9/2016 |
| EP | 3101740 A1 | 12/2016 |
| EP | 3245545 A1 | 11/2017 |
| EP | 3265859 A1 | 1/2018 |
| EP | 3336992 A1 | 6/2018 |
| EP | 3362830 A1 | 8/2018 |
| EP | 3427096 A1 | 1/2019 |
| EP | 3443395 A1 | 2/2019 |
| EP | 3535614 A1 | 9/2019 |
| EP | 3537197 A1 | 9/2019 |
| EP | 3646074 A1 | 5/2020 |
| EP | 3646079 A1 | 5/2020 |
| FR | 2485754 A1 | 12/1981 |
| JP | 61-145509 A | 7/1986 |
| JP | 63-078908 A | 4/1988 |
| JP | 63-089421 A | 4/1988 |
| JP | 03-063615 A | 3/1991 |
| JP | 03-207223 A | 9/1991 |
| JP | 05-297246 A | 11/1993 |
| JP | 06-320111 A | 11/1994 |
| JP | 07-318758 A | 12/1995 |
| JP | 08-292331 A | 11/1996 |
| JP | 09-135526 A | 5/1997 |
| JP | 09-325249 A | 12/1997 |
| JP | 10-339826 A | 12/1998 |

(56) References Cited

FOREIGN PATENT DOCUMENTS

| | | |
|---|---|---|
| JP | 11-064682 A | 3/1999 |
| JP | 11-281861 A | 10/1999 |
| JP | 11-326693 A | 11/1999 |
| JP | 2001-290051 A | 10/2001 |
| JP | 2003-121699 A | 4/2003 |
| JP | 2003-177279 A | 6/2003 |
| JP | 2005-031544 A | 2/2005 |
| JP | 2005-077591 A | 3/2005 |
| JP | 2006-023502 A | 1/2006 |
| JP | 2006-259631 A | 9/2006 |
| JP | 2006-337637 A | 12/2006 |
| JP | 2007-078740 A | 3/2007 |
| JP | 2007-121859 A | 5/2007 |
| JP | 2009-265208 A | 11/2009 |
| JP | 2010-152084 A | 7/2010 |
| JP | 2011-033698 A | 2/2011 |
| JP | 2013-156580 A | 8/2013 |
| JP | 2014-085474 A | 5/2014 |
| JP | 2014-134746 A | 7/2014 |
| JP | 5537852 B2 | 7/2014 |
| JP | 5538328 B2 | 7/2014 |
| JP | 3207233 U | 11/2016 |
| KR | 10-2013-0081087 A | 7/2013 |
| TW | 222688 B | 4/1994 |
| WO | 01/92927 A2 | 12/2001 |
| WO | 03/36358 A2 | 5/2003 |
| WO | 2004/061509 A1 | 7/2004 |
| WO | 2005/045494 A1 | 5/2005 |
| WO | 2006/009597 A1 | 1/2006 |
| WO | 2006/052420 A1 | 5/2006 |
| WO | 2006/113726 A1 | 10/2006 |
| WO | 2008/027201 A2 | 3/2008 |
| WO | 2008/150408 A1 | 12/2008 |
| WO | 2008/150423 A1 | 12/2008 |
| WO | 2009/042066 A1 | 4/2009 |
| WO | 2009/113819 A1 | 9/2009 |
| WO | 2009/117060 A1 | 9/2009 |
| WO | 2009/154990 A2 | 12/2009 |
| WO | 2010/092009 A1 | 8/2010 |
| WO | 2010/099141 A1 | 9/2010 |
| WO | 2011/044090 A2 | 4/2011 |
| WO | 2011/047111 A1 | 4/2011 |
| WO | 2012/027313 A1 | 3/2012 |
| WO | 2012/037727 A1 | 3/2012 |
| WO | 2012/044741 A1 | 4/2012 |
| WO | 2012/163052 A1 | 12/2012 |
| WO | 2013/016042 A1 | 1/2013 |
| WO | 2013/122752 A1 | 8/2013 |
| WO | 2013/126488 A1 | 8/2013 |
| WO | 2014/151259 A1 | 9/2014 |
| WO | 2014/167447 A1 | 10/2014 |
| WO | 2014/179411 A1 | 11/2014 |
| WO | 2014/197894 A1 | 12/2014 |
| WO | 2015/047508 A1 | 4/2015 |
| WO | 2015/144883 A1 | 10/2015 |
| WO | 2015/197588 A1 | 12/2015 |
| WO | 2016/059320 A1 | 4/2016 |
| WO | 2016/073862 A2 | 5/2016 |
| WO | 2016/095213 A1 | 6/2016 |
| WO | 2016/100078 A1 | 6/2016 |
| WO | 2016/115288 A1 | 7/2016 |
| WO | 2016/156610 A1 | 10/2016 |
| WO | 2016/168389 A1 | 10/2016 |
| WO | 2017/063107 A1 | 4/2017 |
| WO | 2017/146722 A1 | 8/2017 |
| WO | 2017/155754 A1 | 9/2017 |
| WO | 2017/178920 A1 | 10/2017 |
| WO | 2018/083561 A1 | 5/2018 |
| WO | 2018/175123 A1 | 9/2018 |
| WO | 2018/204864 A1 | 11/2018 |
| WO | 2019/005190 A2 | 1/2019 |
| WO | 2019/005191 A1 | 1/2019 |
| WO | 2019/005192 A1 | 1/2019 |
| WO | 2019/005193 A1 | 1/2019 |
| WO | 2019/005194 A1 | 1/2019 |
| WO | 2019/005195 A1 | 1/2019 |
| WO | 2019/005196 A1 | 1/2019 |
| WO | 2019/005197 A1 | 1/2019 |
| WO | 2019/005198 A1 | 1/2019 |
| WO | 2019/005199 A1 | 1/2019 |
| WO | 2019/005200 A1 | 1/2019 |
| WO | 2019/005201 A1 | 1/2019 |
| WO | 2019/005202 A1 | 1/2019 |
| WO | 2019/005203 A1 | 1/2019 |
| WO | 2019/005204 A1 | 1/2019 |
| WO | 2019/036339 A1 | 2/2019 |
| WO | 2019/126333 A1 | 6/2019 |
| WO | 2019/195652 A1 | 10/2019 |
| WO | 2020/101850 A1 | 5/2020 |

OTHER PUBLICATIONS

Faulkner et al. "Optical networks for local lopp applications," J. Lightwave Technol.0733-8724 7(11), 17411751 (1989).
Ramanilia et al. "Optical access network using a self-latching variable splitter remotely powered through an optical fiber link," Optical Engineering 46(4) p. 45007-1-9, Apr. 2007.
Ratnam et al. "Burst switching using variable optical splitter based switches with wavelength conversion," ICIIS 2017—Poeceedings Jan. 2018, pp. 1-6.
Wang et al. "Opto-VLSI-based dynamic optical splitter," Electron. Lett.0013-5194 10.1049/el:20046715 40(22), 14451446 (2004).
Xiao et al. "1xN wavelength selective adaptive optical power splitter for wavelength-division-multiplexed passive optical networks," Optics & Laser Technology 68, pp. 160-164, May 2015.
Liu et al., "Variable optical power splitters create new apps", Retrieved from: https://www.lightwaveonline.com/fttx/pon-systems/article/16648432/variable-optical-power-splitters-create-new-apps, 2005, 14 pages.
Chinese Patent Application No. 201980084023.6, Office Action, dated May 24, 2022, 4 pages, Chinese Patent Office.

* cited by examiner

CABLE INPUT DEVICES HAVING AN INTEGRATED LOCKING FEATURE AND ASSEMBLIES USING THE CABLE INPUT DEVICES

PRIORITY

This application claims the benefit of priority under 35 U.S.C. § 119 of U.S. Provisional Application No. 62/908, 218, filed on Sep. 30, 2019, the content of which is relied upon and incorporated herein by reference in its entirety.

FIELD

The disclosure is directed to assemblies having a cable input device with an integrated locking feature for securing the cable input device in a port of a terminal, multiport or the like. More specifically, the disclosure is directed to assemblies having cable input devices with the housing having an integrated locking feature that can be held in a port of a terminal or the like along with methods of securing the same.

BACKGROUND

Optical fiber is increasingly being used for a variety of applications, including but not limited to broadband voice, video, and data transmission. As bandwidth demands increase optical fiber is migrating deeper into communication networks such as in fiber to the premises applications such as FTTx, 5G and the like. As optical fiber extended deeper into communication networks the need for making robust optical connections in outdoor applications in a quick and easy manner was apparent. To address this need for making quick, reliable, and robust optical connections in communication networks hardened fiber optic connectors such as the OptiTap® plug connector were developed.

Terminals such as multiports or closures were also developed for making one or more optical connections with hardened connectors such as the OptiTap plug connector. Prior art multiports have an input cable or input port with a plurality of receptacles mounted through a wall of the housing for protecting an indoor connector inside the housing that makes an optical connection to the external hardened connector of the branch or drop cable.

Illustratively, FIG. 1 shows a conventional fiber optic multiport 1 having an input fiber optic cable 4 carrying one or more optical fibers to indoor-type connectors inside a housing 3. The multiport 1 receives the optical fibers into housing 3 and distributes the optical fibers to receptacles 7 for connection with a hardened connector. The receptacles 7 are separate assemblies attached through a wall of housing 3 of the multiport 1. The receptacles 7 allow mating with hardened connectors attached to drop or branching cables (not shown) such as drop cables for "fiber-to-the-home" applications. During use, optical signals pass through the branch cables, to and from the fiber optic cable 4 by way of the optical connections at the receptacles 7 of multiport 1. Fiber optic cable 4 may also be terminated with a fiber optic connector 5.

Multiports 1 allowed quick and easy deployment for the optical networks by service providers; however, they may be difficult and time consuming to manufacture. By way of explanation, the input fiber optic cable may require structure or components for securing the input cable to the housing along with additional structure for sealing the input cable to the housing such as adhesives or heat shrinks. Consequently, the manufacture of the prior art multiports can be time consuming and expensive.

Further, the housing 3 of the prior art multiport 1 is ruggedized for outdoor deployments, but the housings 3 of multiport 1 are relatively bulky for mounting multiple receptacles 7 for the hardened connector on the housing 3. Receptacles 7 allow an optical connection between the hardened connector such as the OptiTap male plug connector on the branch cable with a non-hardened connector such as the SC connector disposed within the housing 3, which provides a suitable transition from an outdoor space to a protected space inside the housing 3. However, this construction requires a relatively large form-factor where routing space may be at a premium.

Consequently, there exists an unresolved need for small form-factor assemblies that improve manufacturing for quickly and easily attaching a cable input or cable output to a terminal while also addressing concerns related to limited space, organization, or aesthetics of prior art terminals.

SUMMARY

The disclosure is directed to cable input devices along assemblies that use the cable input device such as fiber optic terminals (hereinafter "terminals"). For instance, the cable input device is a portion of a tether cable for a multiport, terminal or the like. Terminals that may use the concepts disclosed herein include multiports, closures, network interface devices, wireless devices or the like. Assemblies having cable input devices along with methods of attaching a portion of the cable input device to the terminal are also disclosed. Although the concepts are disclosed with respect to multiports, the terminals can have any suitable construction or configuration that cooperates with the cable input devices.

One aspect of the disclosure is directed to a cable input device for being received into an input port. The cable input device comprises at least one optical fiber, a jacket, and a housing. The jacket comprises a longitudinal passageway and a portion of the optical fiber is disposed in the longitudinal passageway of the jacket. The housing comprises an outer surface having a locking feature integrally formed in the outer surface, a rear opening, a front opening and a passageway from the rear opening to the front opening. A portion of the optical fiber passes through the passageway and extends beyond the front opening of the housing. The housing may further comprise other features such as a keying portion. The keying portion may be disposed on the outer surface of the housing such as about 180 degrees from the locking feature or the keying portion may be disposed less than 180 degrees from the locking feature on the outer surface of the housing.

Another aspect of the disclosure is directed to an assembly comprising a cable input device and a terminal where a portion of the cable input device is received in the terminal. The cable input device comprises at least one optical fiber, a jacket, and a housing. The jacket comprises a longitudinal passageway and a portion of the optical fiber is disposed in the longitudinal passageway of the jacket. The housing comprises an outer surface having a locking feature integrally formed in the outer surface, a rear opening, a front opening and a passageway from the rear opening to the front opening. A portion of the optical fiber passes through the passageway and extends beyond the front opening of the housing. The terminal comprises a shell having a cavity, at least one input connection port and a securing member associated with the port passageway of the input connection port. The input connection port comprising a port opening extending from an outer surface of the terminal into the cavity and defining a port passageway along a longitudinal axis. The securing member comprises a bore that receives a portion of the housing of the cable input device, and the at least one optical fiber of the cable input device extends into the cavity of the terminal. The securing member may engage the locking feature of the housing to hold the cable input device to the terminal.

The present disclosure is also directed to a method of attaching a portion of a cable input device to a terminal for forming an assembly. The cable input device comprises at least one optical fiber, a jacket, and a housing. The jacket comprises a longitudinal passageway and a portion of the optical fiber is disposed in the longitudinal passageway of the jacket. The housing comprises an outer surface having a locking feature integrally formed in the outer surface, a rear opening, a front opening and a passageway from the rear opening to the front opening. A portion of the optical fiber passes through the passageway and extends beyond the front opening of the housing. The terminal comprises a shell having a cavity, at least one input connection port and a securing member associated with the port passageway of the input connection port. The input connection port comprising a port opening extending from an outer surface of the terminal into the cavity and defining a port passageway along a longitudinal axis. The securing member comprises a bore. The method comprising inserting a portion of the housing of the cable input device into the port opening so that the housing enters the bore of the securing member, and the locking feature of the housing cooperates with the securing member to hold the housing within the input connection port with a portion of the at least one optical fiber of the cable input device disposed within the cavity of the terminal.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure and are incorporated into and constitute a part of this specification. The drawings illustrate various embodiments and together with the description serve to explain the principles and operation.

DETAILED DESCRIPTION

Figure 1:
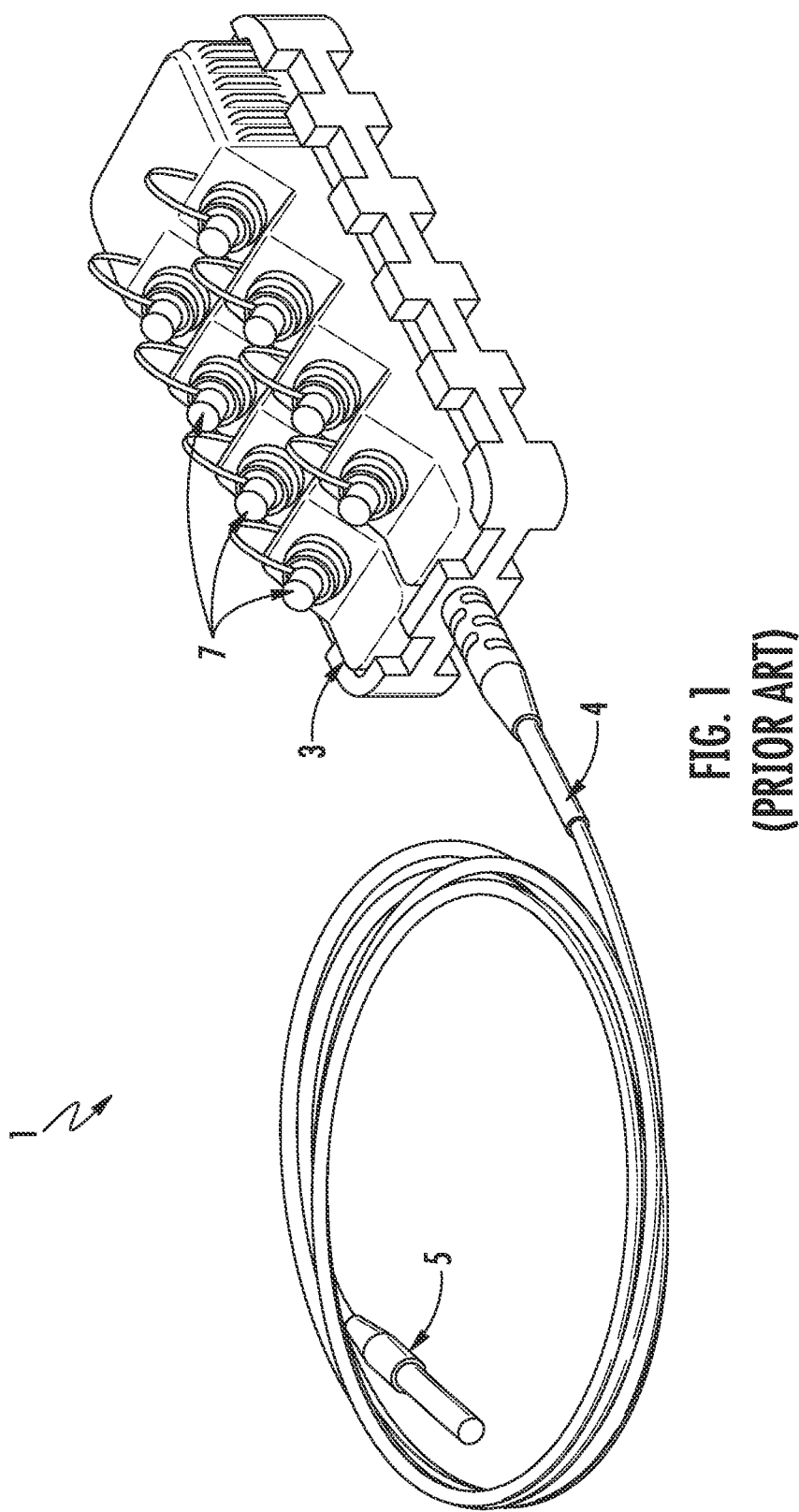
FIG. 1 is a prior art multiport.

Reference will now be made in detail to the embodiments of the disclosure, examples of which are illustrated in the accompanying drawings. Whenever possible, like reference numbers will be used to refer to like components or parts.

The concepts disclosed are related to cable input devices and assemblies using the cable input devices with a terminal having at least one cable input device held in an input connection port of the terminal to form the assembly. Generally speaking, the assemblies with terminals disclosed and explained in the exemplary embodiments are multiports, but the concepts disclosed may be used with any other suitable assemblies using a terminal such as closures, network interface devices, wireless radios or the like having a cable input device. As used herein, the term "terminal" means any device comprising at least one input connection port for receiving a cable input device. And a "multiport" means a device having at least one input connection port for receiving a cable input device and one or more connector ports for receiving an external fiber optical connector for making one or more optical connections.

The concepts disclosed advantageously allow quick and easy manufacturing of the cable input device to the terminal. The concepts may also provide assemblies with compact form-factors. The concepts are scalable to any suitable count of cable input devices on a terminal in a variety of arrangements or constructions and may also be used as a cable output device for providing downstream optical connectivity rather than as a cable input device. As used herein, the "input connection port" means an input connection port or an output connection port of a terminal.

Cable input devices disclosed include a locking feature integrally formed on the housing of the cable input device. The locking feature may engage directly with a securing member of the terminal without conventional structures like prior art devices that require structure for securing the cable input device such as clips, adhesives or the like. Further, the cable input device does not require heat shrinks for sealing the cable input device to the terminal, but cable input device itself may use heat shrinks. Further, the cable input device does not require turning of a coupling nut, bayonet or the like other prior art devices used as cable input device. As used herein, "securing member" is associated with the terminal and excludes threads and features that cooperate with bayonets.

The terminals disclosed may also have one or more connector ports for receiving external optical connectors. The connector ports may include any suitable mating mechanism or geometry for securing the external connector to the terminal. In some embodiments, the connector ports of the terminal may have a push-and-retain connectivity without the use of threaded coupling nuts or quick turn bayonets for securing the external connectors. This allows for terminals with connector ports that are closely spaced together and may result in relatively small terminals since the room needed for turning a threaded coupling nut or bayonet is not necessary. The compact form-factors may allow the placement of the terminals in tight spaces in indoor, outdoor, buried, aerial, industrial or other applications while providing at least one connector port that is advantageous for a robust and reliable optical connection in a removable and replaceable manner. The disclosed terminals may also be aesthetically pleasing and provide organization for the optical connectors in manner that the prior art terminals cannot provide. However, the external fiber optic connectors may be secured to the terminal using conventional structures such as threads, bayonets or other suitable mating geometry for attaching to the connector ports of the terminal.

Unlike prior art terminals or multiports, the concepts disclosed advantageously allow the quick and easy assembly of the cable input device to the input connection port of the terminal. The retention of the cable input device is accomplished by inserting a portion of the housing of the cable input device into the input connection port of the terminal until it is fully seated therein. The cable input device does need structures or manufacturing steps for turning a threaded coupling nut or bayonet for retaining the cable input device.

The cable input devices disclosed comprise a housing for directly cooperating and engaging with a securing member of the terminal and at least one optical fiber of the cable input device extends into a cavity of the terminal. The housing of the cable input device is not a connector housing that supports a ferrule that terminates the optical fiber. Instead, one or more optical fibers extend from the cable into cavity of the multiport.

The securing member for holding the cable input device at the input connection port of the terminal allows smaller footprints along with a quick-connect feature for quick and easy of manufacturing. If desired, the securing member of the input connection port of the terminal is not accessible on the terminal for releasing the housing of the cable input device from the terminal. In other words, once fully-assembled the securing member of the terminal is inhibited from releasing cable input device from the input connection port. Other variations of terminals may provide a non-functional button or other non-functional structure that inhibits the release of the housing from the input connection port since the non-functional structure will not translate the securing member.

Terminals may also have a dense spacing of connector ports for receiving external optical connectors if desired or not. The terminals disclosed herein advantageously allow a relatively dense and organized array of connector ports in a relatively small form-factor while still being rugged for demanding environments. As optical networks increase densifications and space is at a premium, the robust and small-form factors for devices such as terminals becomes increasingly desirable for network operators.

The concepts disclosed herein are suitable for optical distribution networks such as for Fiber-to-the-Home and 5G applications and are equally applicable to other optical applications as well including indoor, automotive, industrial, wireless, or other suitable applications. Additionally, the concepts disclosed may be used with terminals having any suitable footprint or construction. Various designs, constructions, or features for devices are disclosed in more detail as discussed herein and may be modified or varied as desired.

Figure 2:
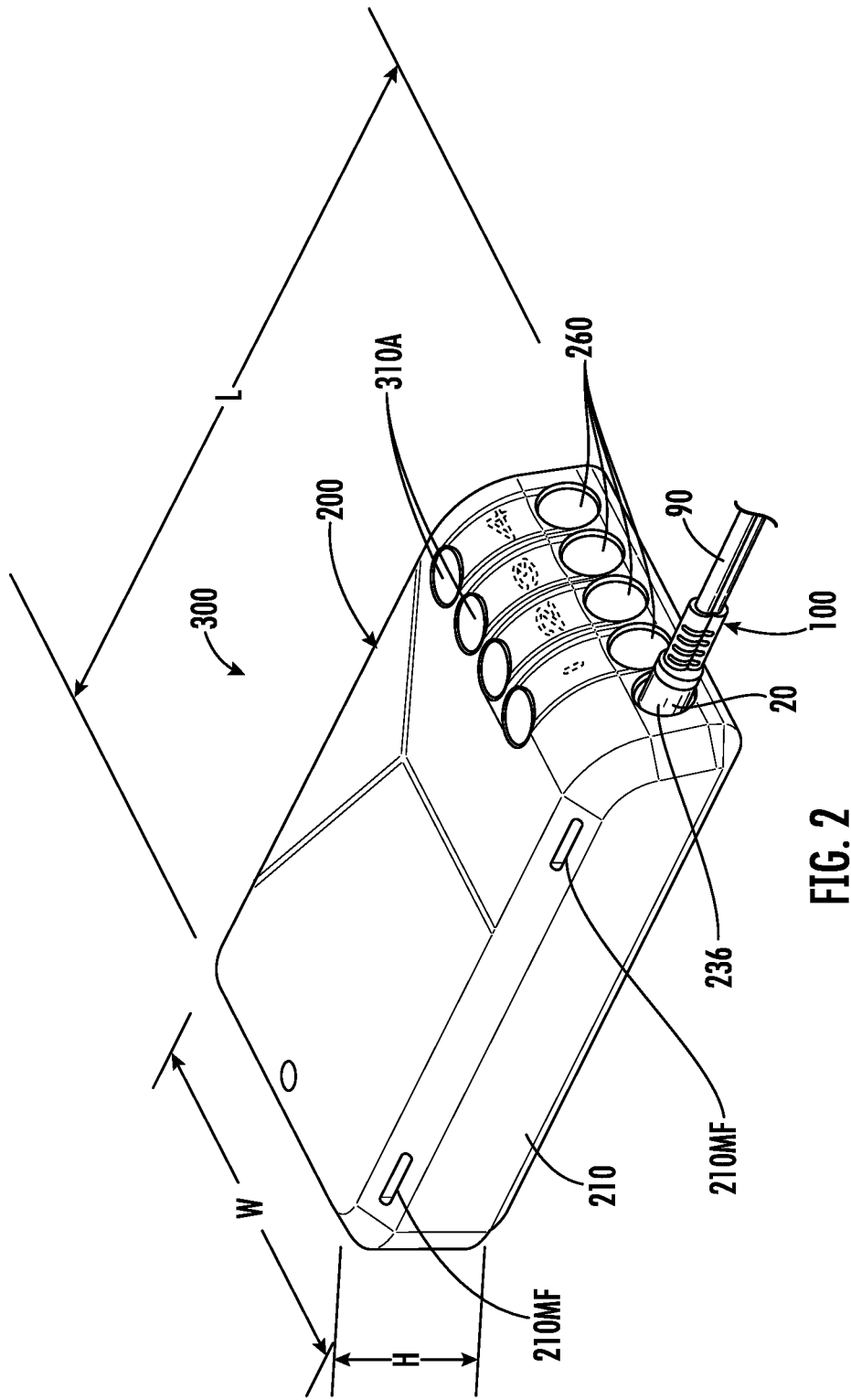
FIG. 2 is a perspective view of an assembly showing an explanatory terminal having a cable input device held within an input connection port of the terminal.
Figure 3:
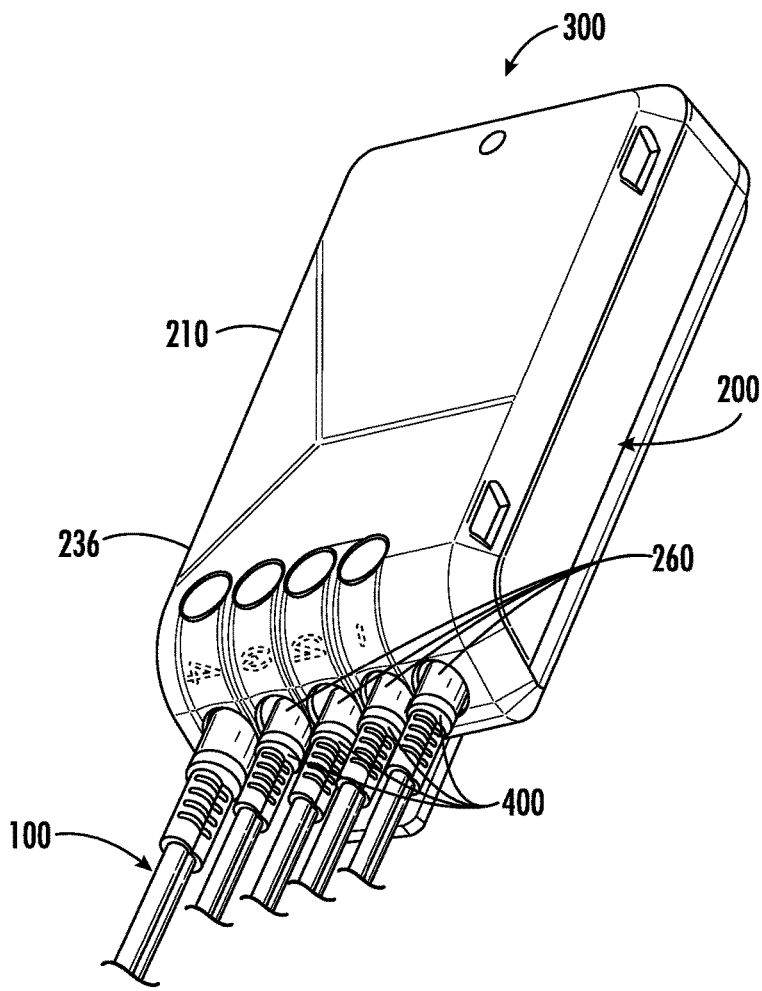
FIG. 3 is a perspective view of the terminal showing the cable input device held within an input connection port of the terminal along with a plurality of external optical connectors optically connected to the terminal via connector ports.

FIG. 2 shows a perspective view of an explanatory assembly comprising a cable input device 100 and a terminal 200 configured as a multiport. Although, these concepts are described with respect to terminals configured as multiports the concepts may be used with any other suitable terminal such as closures, network interface devices, wireless devices, distribution point unit or other suitable devices. As shown in FIG. 2, the terminal 200 has a cable input device 100 held in a input connection port 236 on the left-side. A plurality of open connector ports 260 are shown to the right of input connection port 236 and are suitable for receiving a plurality of external fiber optic connectors for making an optical connection with the terminal 200. FIG. 3 depicts terminal 200 with a plurality of external fiber optic connectors terminated on cable assemblies 400 and disposed in the connector ports 260.

Figure 4:
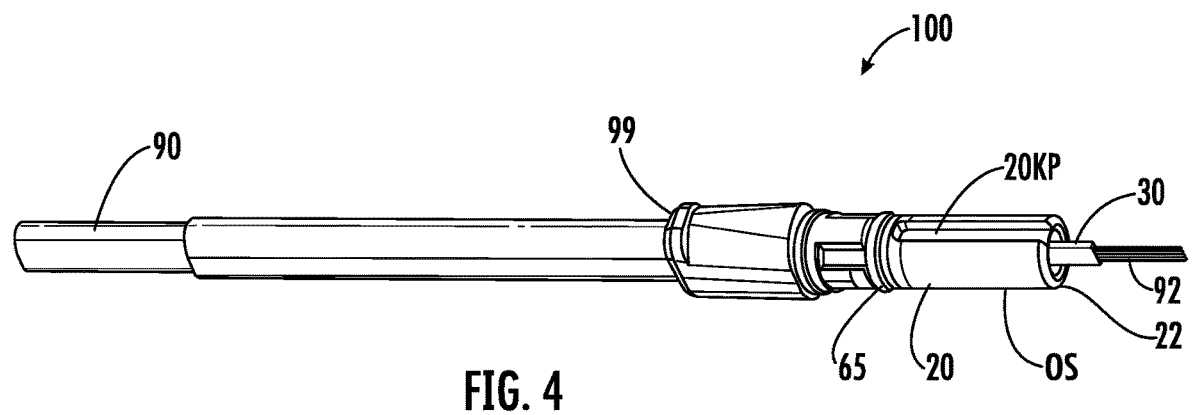
FIG. 4 is a perspective view of an explanatory cable input device.
Figure 5:
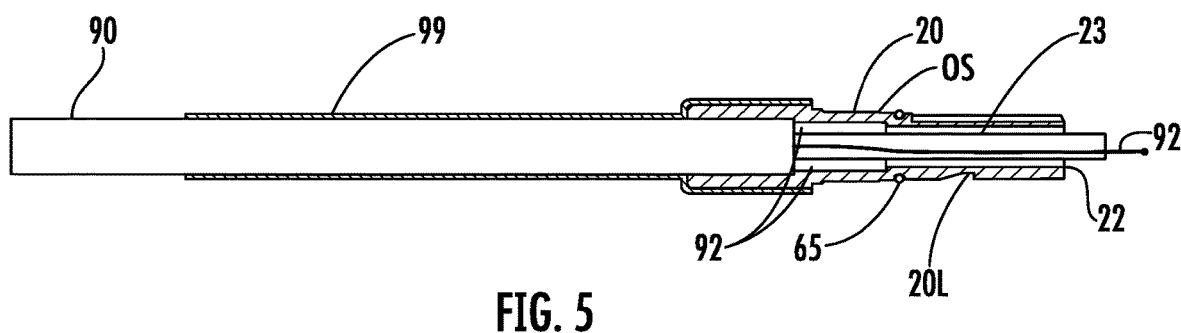
FIG. 5 is a cross-sectional view of the cable input device of FIG. 4.
Figure 6:
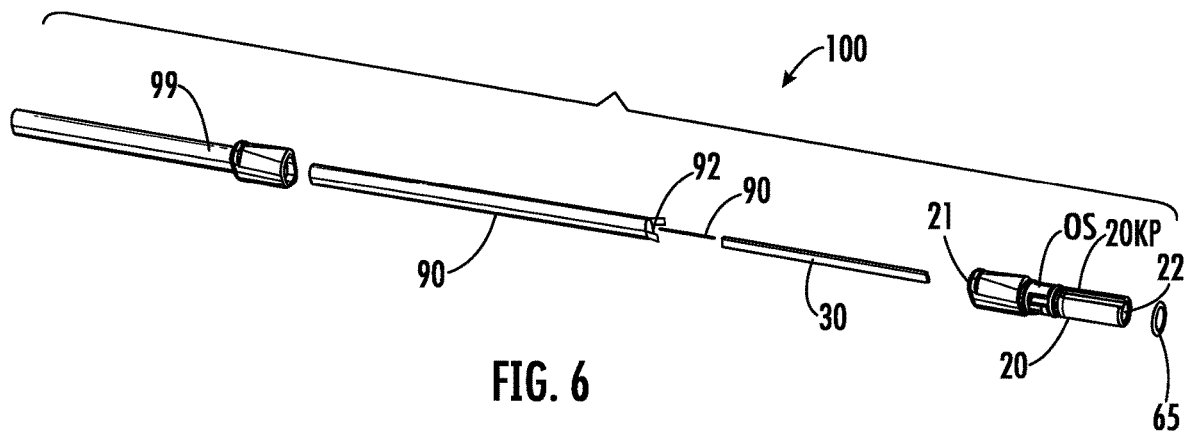
FIG. 6 is an exploded view of the cable input device of FIG. 4.

FIGS. 4-6 depict various views of an explanatory cable input device 100. The cable input device 100 comprises at least one optical fiber 92, a jacket 90 with a portion of the optical fiber 92 disposed in the jacket 90, and a housing 20 having a locking feature 20L integrally formed in an outer surface OS of the housing 20. A portion of the optical fiber 92 passes through a passageway 23 of the housing 20 and extends beyond a front opening 22 of the housing such as shown in FIG. 4. When assembled with a terminal, the optical fiber(s) 92 may be routed and attached for optical communication in any suitable manner within the cavity of the terminal such as being terminated by a connector or in optical communication with a splitter or other devices.

FIG. 5 depicts a cross-sectional view of cable input device 100 and FIG. 6 depicts an exploded view of the cable input device 100 of FIG. 4. As shown, cable input device 100 comprises housing 20 that is used for holding the cable input device 100 in the input connection port 236 of terminal 200. Housing 20 comprises an outer surface OS having a locking feature 20L integrally formed in the outer surface OS. Locking feature 20L is used for holding the cable input device 100 in the terminal. The housing 20 may also include a keying portion 20KP for orientating the rotational position upon insertion into the input connection port of the terminal. For instance, the keying portion 20KP may comprise a female key, but other keys may be used. The female key would cooperate with protrusion or male key disposed on the passageway of the input connection port of the terminal. Additionally, the locking feature 20L may be orientated relative to the keying portion 20L in any suitable fashion. By way of explanation, the locking feature 20L may be disposed about 180 degrees from the keying portion 20KP or the female key. Of course, other rotational orientations may be possible with the concepts disclosed. An O-ring 65 may be disposed on housing 20. The O-ring may be disposed rearward of the locking feature 20L for sealing the housing 20 to the input connection port 236.

Locking feature 20L of housing 20 may have any suitable geometry desired. For instance, the locking feature 20L may comprise a notch, a groove, a shoulder or a scallop as desired. As depicted, locking feature 20L comprises a notch integrally formed in the outer surface OS of housing 20, but other structures are possible. In this instance, the notch comprises a ramp with a ledge. The ledge is formed at the forward end of the notch to form a retention force for holding the housing. However, retention surface 310RS may have different surfaces or edges that cooperate for securing the cable input device and creating the desired mechanical retention. For instance, the ledge may be canted or have a vertical wall. However, other geometries are possible such as a hole for receiving a pin on the securing feature of the terminal.

Jacket 90 of the cable input device may have any suitable construction desired. For instance, the jacket 90 could simply be a tube. However, it may be desirable to have one or more strength members as a portion of the jacket 90. By way of example, one or more strength yarns or glass-reinforced plastic rods may be a portion of the jacket 90. The jacket 90 may be secured to the housing 20 in any suitable manner such as by using an adhesive or a crimp band as known. By way of explanation, an adhesive may be placed into the housing 20 for securing the jacket 90 to the housing 20.

Still further, the cable input device 100 may comprise a tubing 30 for protecting and guiding the optical fiber(s) 92. For example, tubing 30 may be inserted into a portion of the jacket 90. More specifically, tubing 30 may be inserted into a forward end of jacket 90 and secured by friction or adhesive as desired. Thus, the optical fiber(s) 92 will having a portion disposed within the tubing 30. The tubing 30 may have a length that extends beyond a front opening 22 of housing 20 for inhibiting sharp bends of the optical fibers 92. Still further, a tubing heat shrink 99 maybe disposed about a portion of the tubing 30 and a portion of the optical fiber(s) 92. The use of a heat shrink secures the optical fiber(s) 92 to the tubing 30 for inhibiting relative movement of the optical fibers therebetween. Cable input device 100 may also have a heat shrink 99 disposed about a portion of the jacket 90 and a portion of the housing 20. Providing heat shrink 99 between the jacket 90 and a rear portion of housing 20 aids in sealing at the interface and may also inhibit sharp bending. Other components or constructions may be used with the cable input device as well such as a boot.

Figure 7:
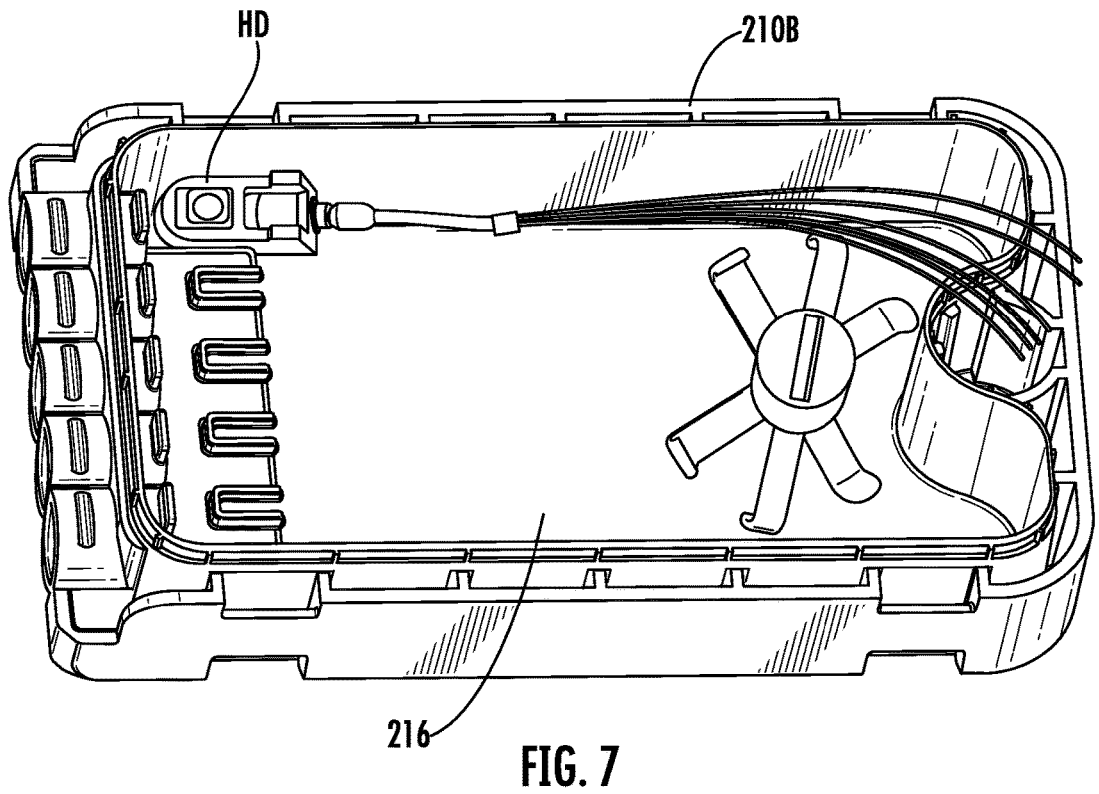
FIG. 7 is view of the assembly showing the cable input device held in the input connection port of the terminal with the cover of the terminal removed and showing the optical fibers of the cable input device extending into the cavity of the terminal.
Figure 8:
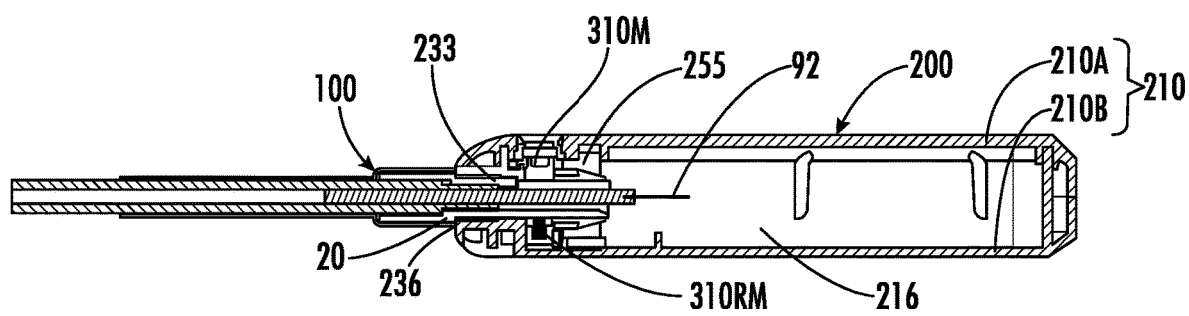
FIG. 8 is a cross-sectional schematic view of an assembly showing the cable input device held at the input connection port of the terminal.

As shown in FIGS. 7 and 8, terminal 200 comprises a shell 210 with a cavity 216 along with a securing member 310M associated with the port passageway 233. At least one optical fiber of the cable input device 100 extends into the cavity 216 of the shell 210 of terminal 200 as depicted in the partially assembled view of FIG. 7. FIG. 8 depicts a cross-section through the input connection port passageway 233 showing the internal construction of terminal 200, and FIG. 9 is an exploded view of a holding device HD for holding the cable input device 100 in the input connection port 236.

The input connection port 236 comprises a port opening extending from an outer surface of the terminal 200 into the cavity 216 of the terminal 200 and defines a port passageway along a longitudinal axis. The securing member 310M is associated with the input connection port 236. The securing member 310M comprises a bore 310B suitable for receiving a portion of the housing 20 of the cable input device 100.

Generally speaking, the terminals 200 disclosed herein comprise at least one input connection port 236 defined by an opening extending into a cavity 216 of the terminal 200. Terminals 200 also comprise a holding device HD (FIG. 9) comprising a securing member 310M that is associated with the input connection port 236 of the terminal 200. Consequently, the end of the cable input device 100 may be inserted quickly and easily into the input connection port 236 during assembly so that the housing 20 cooperates with the holding device HD. More specifically, the cable input device 100 is inserted into the input connection port 236 so that a securing member 310M of the holding device HD cooperates with the locking feature 20L of the housing 20 for holding the cable input device 100 within the input connection port 236 of terminal 200. This construction of the cable input device 100 and terminals 200 advantageously avoids the use of adhesives, heat shrinks or clips for holding the cable input device 100 to terminal 200 and allows improves manufacturing for the assembly. FIG. 10 is a partially exploded view of terminal 200 showing the optical fibers 250 that optically connect the connection ports 236 with the input port 260 inside the device.

Figure 9:
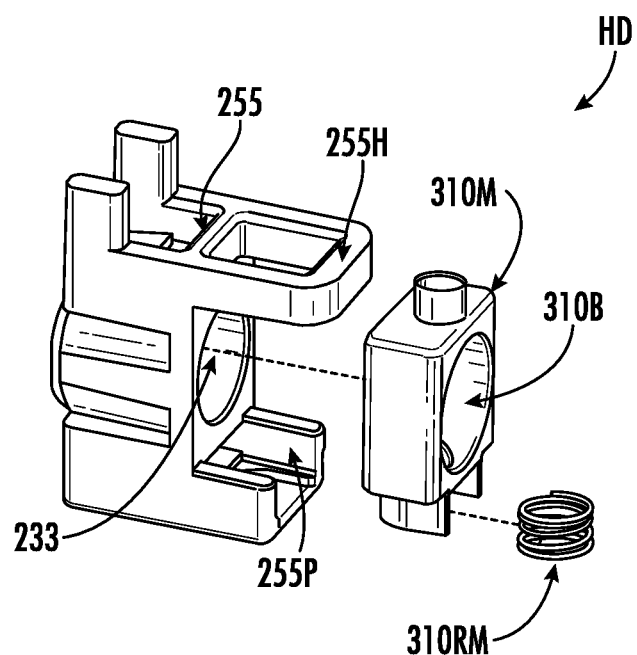
FIG. 9 is an exploded view showing a securing member and a resilient member of the terminal for securing the housing of the cable input device at the input connection port.
Figure 10:
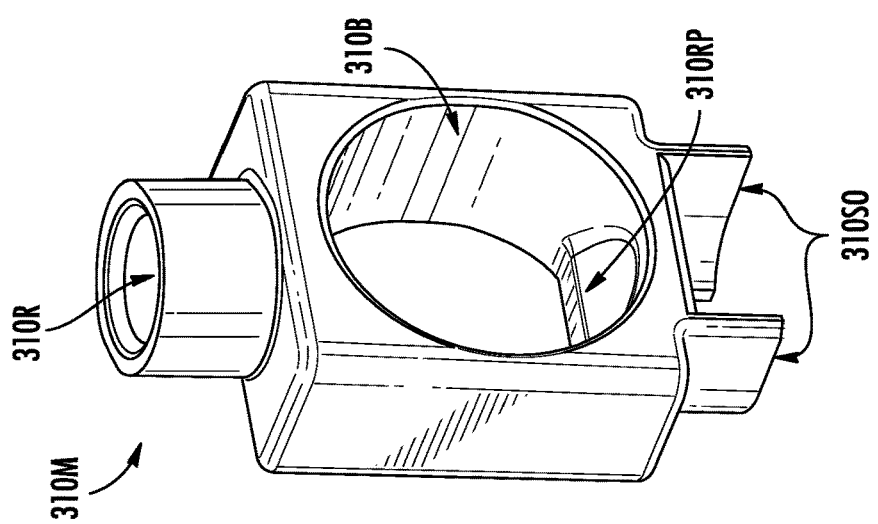

FIG. 9 depicts an exploded view of an explanatory holding device HD for holding the cable input device 100 within the terminal 200. The holding device HD may use a resilient member 310RM for biasing a portion of the securing member 310M as discussed herein if desired, but embodiments do not require a securing feature resilient member depending on the construction desired. For instance, the housing 20 may be placed through the bore 310B, and then the securing member 310M may be fixed in position in a suitable manner such as placing a spacer in the holding device HD to inhibit movement of the securing member 310M.

As shown in FIG. 9, securing feature 310 of holding device HD may be biased to a retain position using a spring. Specifically, the securing member 310M is biased in an upward direction using a securing feature resilient member 310RM. More specifically, securing feature resilient member 310RM is disposed beneath securing member 310M for biasing the securing member to a normally retain position for the securing feature 310 where the locking feature 310L is disposed in the connection port passageway 233. The holding device HD may also comprise other structure as desired. For instance, the holding device HD may include a body 255 as discussed herein.

Figure 12:
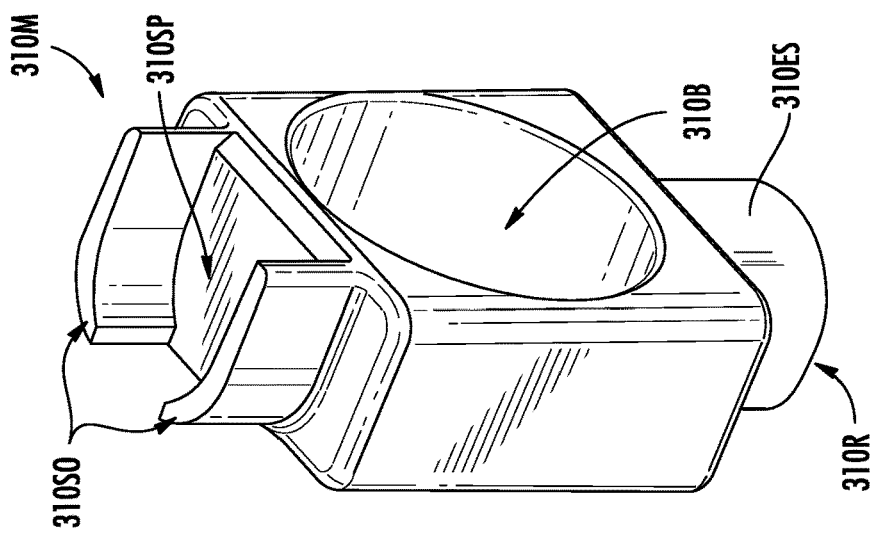
FIGS. 10-12 are various views showing the details of the securing member of FIG. 8.
Figure 11:
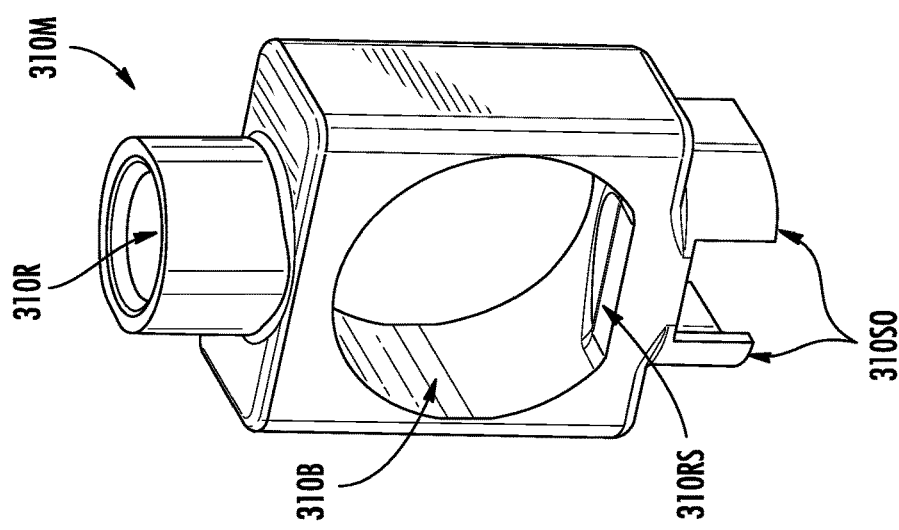

FIGS. 10-12 depict securing member 310M comprising a locking feature 310L and will be discussed in further detail. The securing member 310M may be used with the holding device HD or with a securing feature 310 for releasably attaching an external connector as discussed below. Locking feature 310L cooperates with locking feature 20L of housing 20 (or an external connector) when the housing 20 is fully inserted into the input connection port 236 for securing the same. As best shown in FIG. 8, the housing 20 of cable input device 100 may have a cooperating geometry that engages the locking feature 310L of securing member 310M of terminal 200. In this embodiment, locking feature 310L of securing member 310M comprises a ramp 310RP. The ramp is integrally formed at a portion of the bore 310B with the ramp angling up when looking into the input connection port 236. The ramp allows the housing 20 (or external connector) to push and translate the securing member 310M downward against the securing feature resilient member 310RM as the housing 20 is inserted in the input connection port 236. Ramp may have any suitable geometry. Once the locking feature 310L of the securing member 310M is aligned with the cooperating geometry of the locking feature 20L of housing (or external connector), then the securing member 310M translates upward so that the locking feature 310L engages the locking feature 20L of the housing (or external connector).

Locking feature 310L comprises a retention surface 310RS. In this embodiment, the backside of the ramp of locking feature 310L forms a ledge that cooperates with complimentary geometry on the housing 20 (or external connector). However, retention surface 31ORS may have different surfaces or edges that cooperate for securing connector for creating the desired mechanical retention. For instance, the retention surface 31ORS may be canted or have a vertical wall. However, other geometries are possible for the retention surface 310RS.

Figure 13:
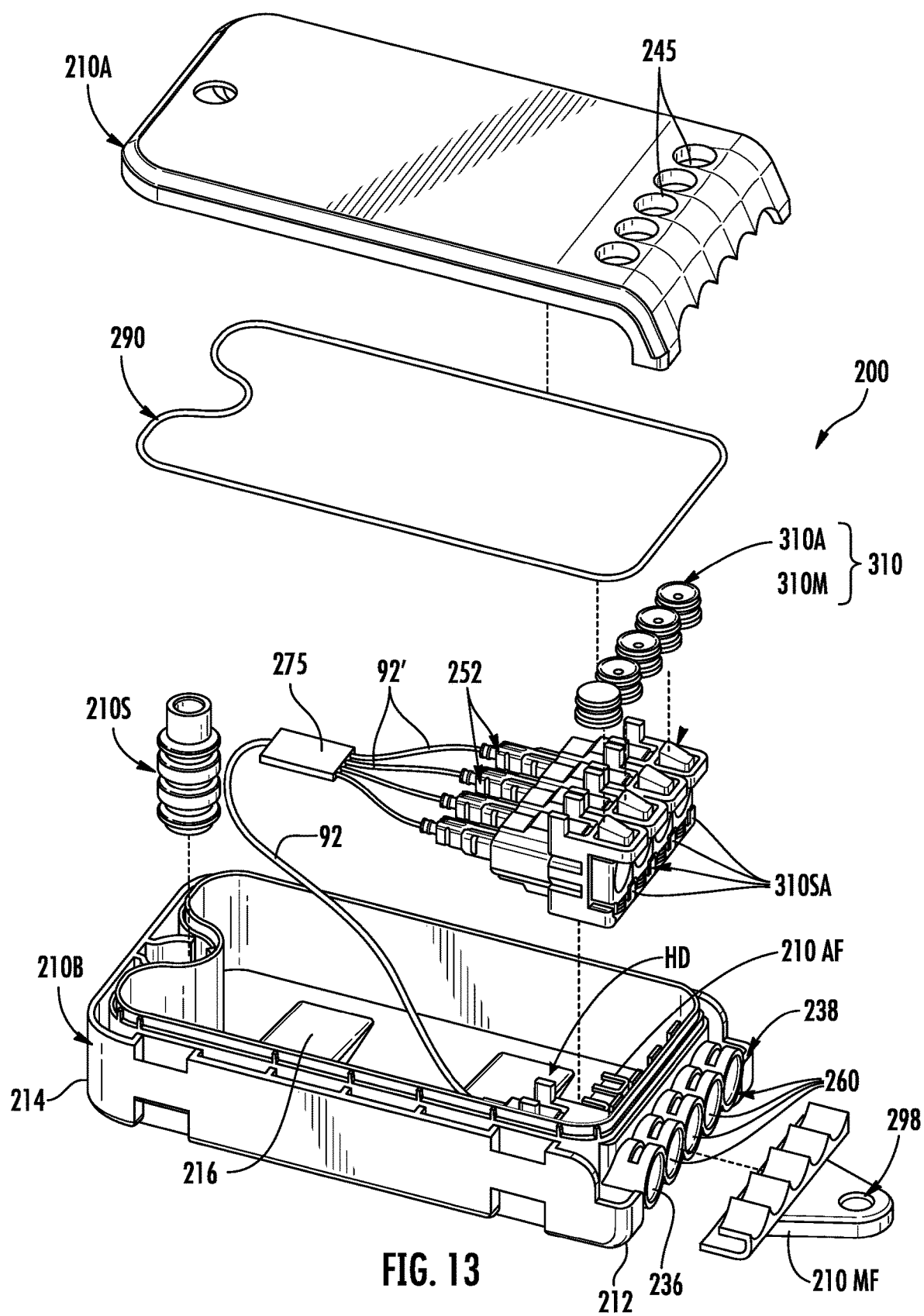
FIG. 13 is a partially exploded view of a terminal with cable input device removed to show the connector ports and other features of the terminal.
Figure 14:
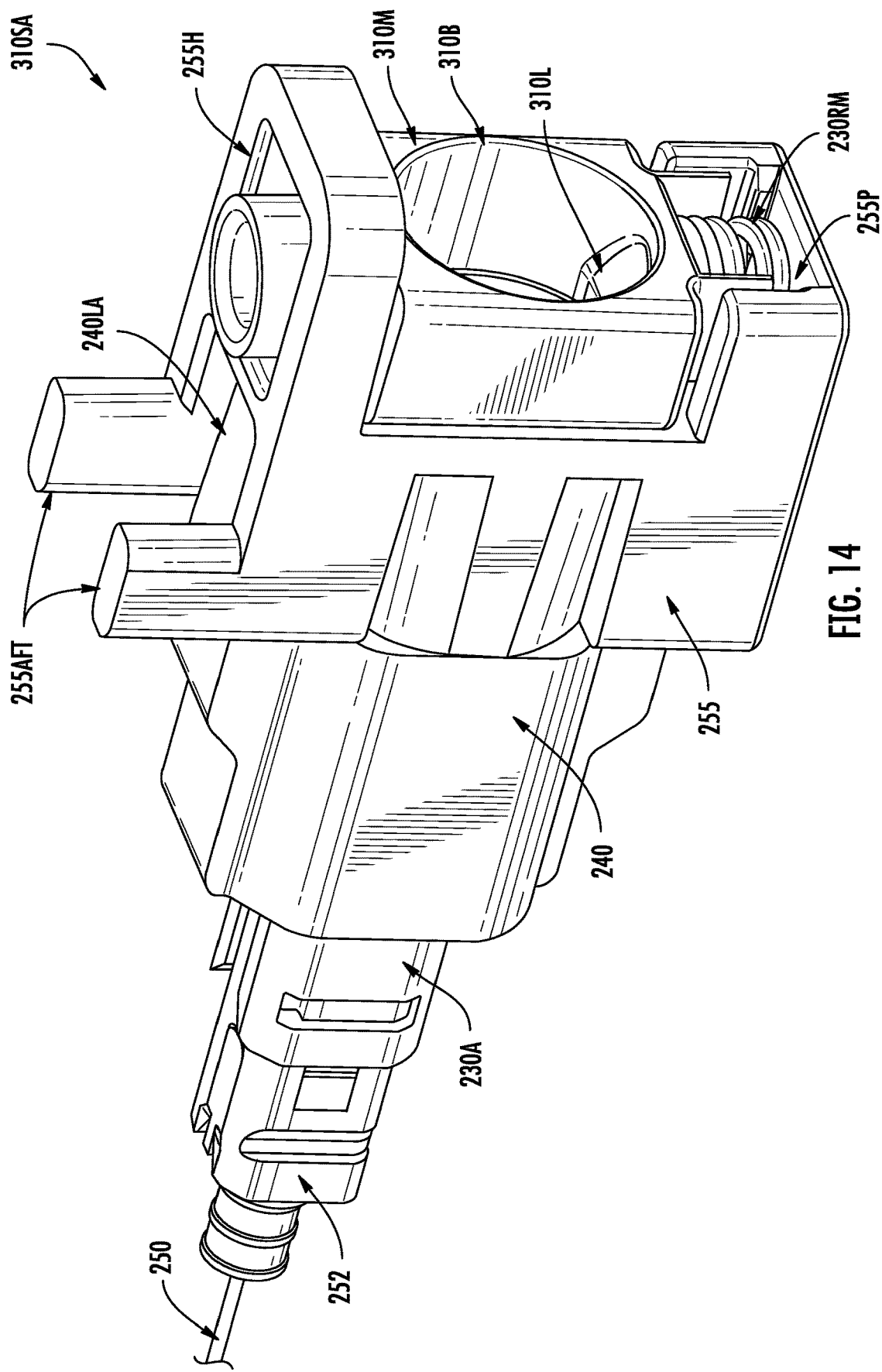
FIG. 14 is an assembled perspective view of the modular adapter sub-assembly associated with the respective connector ports of the terminal of FIG. 13 for receiving an external fiber optic connector to mate with the internal connector of the terminal.
Figure 15:
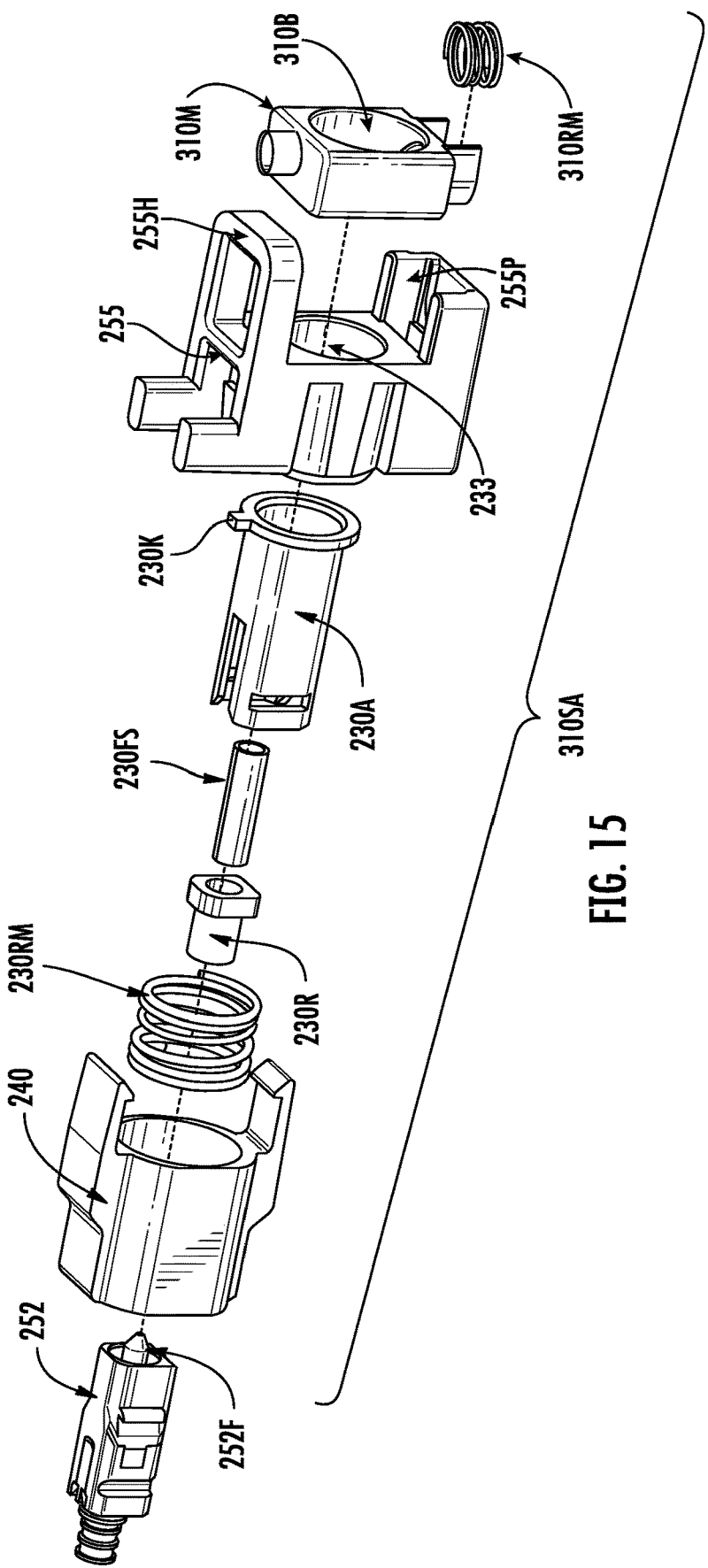
FIG. 15 is an exploded view of the modular adapter sub-assembly of FIG. 14 along with the internal connector of the terminal.

Terminals 200 may also advantageously use the securing members 310M for releasably connecting the external connectors of the cable assemblies 400 in the connector ports 260 using a securing feature 310 with an actuator 310A as shown in FIG. 2. FIG. 13 is an exploded view of another explanatory terminal 200, and FIGS. 14 and 15 show an exploded view of a modular sub-assemblies 310SA associated with respective connector ports 260 for releasably securing an external connector. The modular sub-assemblies 310SA may use parts that are similar to the parts of holding device HD.

Connection ports 236 of terminal 200 each comprises a respective optical connector opening 238 extending from an outer surface 234 of the terminal 200 into a cavity 216 of the terminal 200 and defining a portion of a connection port passageway 233. By way of explanation, at least one connection port 236 is molded as a portion of shell 210, but other constructions are possible such as sleeving the ports. At least one securing feature 310 is associated with the connection port passageway 233 for cooperating with the external fiber optic connector 10.

FIG. 13 depicts a portion of an assembly having an explanatory terminal 200 comprising a shell 210 comprising at least one input connection port 236 with an associated securing member 310M of holding device HD, a plurality of connector ports 260 and a modular adapter sub-assembly 310SA associated with each of the plurality of connector ports 260 as discussed in further detail herein. Further, FIG. 13 only depicts a single optical fiber 92 of the cable input device 100 disposed within the cavity 216 of the terminal 200 along with the holding device HD for securing the cable input device 100 the sake of simplicity.

As depicted in FIG. 13, terminals 200 disclosed may use one or more modular adapter sub-assemblies 310SA (FIGS. 14 and 15) disposed within the shell when assembled for a scalable form-factor for manufacturing similar devices with different connector port counts. However, the concepts may be employed without the use of the modular adapter sub-assemblies by having the adapters mounted on a common part, but then the adapters for the individual connection ports would not "float" independently. The shell 210 comprises at least one input connection port 236 and one or more connector ports 260 respectively associated with one or more respective securing features 310 cooperating with the connector ports for providing quick and easy optical connectivity with external connectors for providing a robust and reliable assembly design that is intuitive to use.

Optical connections to the terminal or assembly are made by inserting one or more suitable external fiber optic connectors into respective connector port 260 as desired. Specifically, the connector port 260 is configured for receiving a suitable external connector of cable assembly 400. However, the concepts disclosed may have connector ports 260 that secure the external connector in any other suitable manner such as threads, bayonet, push-pull or push-and-retain.

The terminal 200 of FIG. 13 uses a plurality of securing features 310 for retaining (e.g., securing) the external connector in the terminal 200 in a push-and-retain fashion for making an optical connection. The securing feature 310 advantageously allows the user to make a quick and easy optical connection at the connector port(s) 260 of terminal 200. The securing feature 310 may also operate for providing a connector release feature by moving the actuator 310A such as a button to translate the securing member 310M to an open position (e.g., downward) for releasing the external fiber optic connector of cable assembly 400.

External connectors terminated to respective cable assemblies 400 may be retained within the respective connection ports 260 of the terminal 200 by pushing and fully seating the connector within the connector port 260 if the securing member 310M is allowed to translate to an open position when inserting the external connector. To release the connector from the respective connector port 260, the actuator 310A is actuated by moving the actuator 310A (e.g., pressing the button downward) and translating the securing member 310M so that the locking feature disengages from the external connector and allowing the connector to be removed from the connector port 260. Stated another way, the at least one securing feature 310 is capable of releasing the connector when a portion of the securing feature 310 (i.e. the securing member 310M) translates within a portion of a securing feature passageway 245 of the shell 210. The full insertion and automatic retention of the connector may advantageously allow one-handed installation of the connector by merely pushing the external connector into the connector port 260. The devices disclosed may accomplish this connector retention feature upon full insertion by biasing the securing member 310M of the modular adapter sub-assemblies 310SA to the retain position. However, other modes of operation for retaining and releasing the connector are possible according to the concepts disclosed. As discussed, the securing feature may be designed to require actuation by translating the actuator 310A for inserting the connector; however, this may require a two-handed operation.

Shell 210 may be formed by a first portion 210A and a second portion 210B, but other constructions are possible for shell 210 using the concept disclosed. Terminal 200 may comprise mounting features 210MF that are integrally formed in the shell 210 as shown in FIG. 2. Additionally, the mounting features may be separate components attached to shell 210 for mounting the device as depicted in FIG. 13. By way of example, FIG. 2 shows shell 210 depicts mounting features 210MF disposed near the sides of shell 210. Thus, the user may simply use a fastener such as a zip-tie threaded thru these lateral passageways for mounting the terminal 200 to a wall or pole as desired. In FIG. 13 another mounting feature 210MF is disposed adjacent the first end 212 of terminal 200 and includes a mounting tab 298 attached to shell 210, and the mounting feature 210MF adjacent the second end 214 is a through hole with a support 210S. However, mounting features 210MF may be disposed at any suitable location on the shell 210 or connection port insert 230. Shell 210 may also include one or more notches on the bottom side for aiding in securing the device to a round pole or the like.

Securing member 310M may be biased by a resilient member 230RM to the retain position RP (e.g., upward). Furthermore, the securing features 310 or portions of securing features 310 may be constructed as a portion of a modular adapter sub-assemblies 310SA such as shown in FIGS. 14 and 15 for easy assembly of the terminal 200.

Moreover, the modular sub-assemblies 230SA advantageously allow the mating components for each connection port 236 to move or "float" independently of other mating components relative to the shell 210 for the other connection ports for preserving optical performance. "Float" means that the adapter 230A can have slight movement in the X-Y plane for alignment, and may be inhibited from over-traveling in the Z-direction along the axis of connector insertion so that suitable alignment may be made between mating connectors, which may include a biasing spring for allowing some displacement of the adapter 230A with a suitable restoring force provided by the spring.

As best depicted in FIG. 13, a portion of actuator 310A is disposed within a portion of the securing feature passageway 245 when assembled and cooperates or engages with securing member 310M to provide linear downward translation of the respective securing member 310M. When assembled, the translating of the actuator 310A causes the securing member to translate from a retain position RP to an open position OP and vice versa. Consequently, a portion of securing feature 310 (i.e., the securing member 310M) is capable of translating within a portion of the securing feature passageway 245 transverse to the longitudinal axis of the connection port passageway when translating the actuator 310A relative to the securing feature passageway 245 or shell. If a push and click connector port 260 is desired when the securing feature 310 is in the retain position, then the actuator 310A would only influence the position of the securing member 310M in one direction (and a securing feature resilient member 310RM would be used) so that the external connector may be still be inserted when the sliding actuator 310A is placed in the retain position by allowing the translation of the securing member 310M downward upon insertion. Actuator 310A may also include a sealing feature (not numbered) for providing a seal between a portion of the securing feature 310 and the securing feature passageway 245 to inhibit dirt, dust and debris from entering the device. As shown, the sealing feature is disposed on an outer portion of the actuator 310A.

The securing member 310M comprises a bore 310B that is aligned with the connector port passageway 233 when assembled. Bore 310B is sized for receiving a suitable external connector therethrough for securing the same for optical connectivity. Bores or openings through the securing member 310M may have any suitable shape or geometry for cooperating with its respective external connector (or housing 20). As used herein, the bore may have any suitable shape desired including features on the surface of the bore for engaging with the desired connector. Bore 310B is disposed on the securing member 310M may also comprise any suitable locking feature disposed within the bore 310B as desired. For instance, the locking feature 310L disposed within the bore 310B may be a pin, pin with a ramp, or other suitable structure for engaging with the external connector.

In some embodiments, a portion of the securing member 310M is capable of moving to an open position when inserting a suitable external connector 10 into the connection port passageway 233. When the connector 10 is fully inserted into the connector port passageway 233, the securing member 310M is capable of moving to the retain position automatically. Consequently, the external connector is secured within the connector port 236 by the securing feature 310 without turning a coupling nut or a bayonet on the external connector like the prior art terminals. Stated another way, the securing member 310M translates from the retain position to an open position as the external connector 10 is inserted into the connector port 236. The securing feature passageway 245 is arranged transversely to a longitudinal axis LA of the terminal 200, but other arrangements are possible. Other securing features may operate in a similar manner and use an opening instead of a bore that receives the connector therethrough.

Generally speaking, the connector port passageways may be configured for the specific connector intended to be received in the connector port 236. Likewise, the connector port passageways should be configured for receiving the specific rear connector 252 for mating and making an optical connection with the external connector.

The terminal 200 may also comprise at least one adapter 230A aligned with the respective connector port 260. Adapter 230A and other components are a portion of the modular sub-assembly 310SA as depicted in FIGS. 14 and 15. Adapter 230A is suitable for securing a rear connector 252 thereto for aligning the rear connector 252 with the connector port 260. One or more optical fibers 92' (FIG. 13) may be routed from the connector ports 260 toward an input connection port 236 of the terminal 200. For instance, the rear connectors 252 may terminate the optical fibers 92' that are in optical communication with the optical fiber(s) 92 of the cable input device 100 for optical connection at connector ports 260.

A plurality of rear connectors 252 are aligned with the respective connector port passageways within the cavity 216 of the terminal 200. The rear connectors 252 are associated with one or more of the plurality of optical fibers 92'. Each of the respective rear connectors 252 aligns and attaches to a structure such as the adapter 230A or other structure related to the connection port passageway in a suitable matter. The plurality of rear connectors 252 may comprise a suitable rear connector ferrule 252F as desired and rear connectors 252 may take any suitable form from a simple ferrule that attaches to a standard connector type inserted into an adapter. By way of example, rear connectors 252 may comprise a resilient member for biasing the rear connector ferrule 252F or not. Additionally, rear connectors 252 may further comprise a keying feature.

The rear connectors 252 shown in FIGS. 14 and 15 have a SC footprint, but other connectors are possible with or without the use of an adapter. As known, the SC footprint may be defined according to IEC 61754:2013. If SC connectors are used as the rear connector 252 they have a keying feature that cooperates with the keying feature of adapter 230A. Additionally, adapters 230A comprise a retention feature (not visible) for seating the adapters 230A in the device adjacent to the connection port passageway. Further, adapters 230A may comprise latch arms for securing respective rear connectors therein.

The input connection port passageway 233 or connector port passageway may comprise a keying portion disposed forward of the securing feature 310 in connection port passageway. The keying portion may be an additive keying portion to the primitive geometric round shape of the input connection port passageway 233 such as a male key that is disposed forward of the securing feature in the port passageway. However, the concepts for the input connection port 236 (or connector port) of terminals may be modified for different housing or connector designs or not use a keying portion at all.

In this embodiment, the rear connectors 252 are attached to optical fibers 92' that are routing through an optical splitter 275 (hereinafter "splitter(s)") for optical communication with the optical fiber 92 of the cable input device 100. Other embodiments may forgo the splitter or in other embodiments the terminal may use multiple splitters. When assembled, the modular adapter sub-assembly 310SA for the connector ports 260 are disposed in second portion 210B of shell 210.

Optical fibers 92' are routed from one or more of the plurality of connection ports 260 toward an input connection port 236 for optical communication within the terminal 200. Consequently, the input connection port 236 receives one or more optical fibers and then routes the optical signals as desired such as passing the signal through 1:1 distribution, routing through an optical splitter or passing optical fibers through the terminal. Splitters 275 allow a single optical signal to be split into multiple signals such as 1×N split, but other splitter arrangements are possible such as a 2×N split. For instance, a single optical fiber may feed input connection port 260 and use a 1×8 splitter within the terminal 200 to allow eight connector ports 260 for outputs to external connectors on the terminal 200. The cable input device 100 may be configured in a suitable manner with any of the terminals 200 disclosed herein as appropriate such as a single-fiber or multi-fiber port. Likewise, the connector ports 260 may be configured as a single-fiber port or multi-fiber port. For the sake of simplicity and clarity in the drawings, all of the optical fiber pathways may not be illustrated or portions of the optical fiber pathways may be removed in places so that other details of the design are visible.

Additionally, the terminals or shells 210 may comprise at least one support 210S or fiber guide for providing crush support for the terminal and resulting in a robust structure. As depicted in FIG. 13, terminal 200 may comprise a support 210S configured as a support insert that fits into shell 210. Support 210S has a bore therethrough and may act as a mounting feature for the use to a fastener to mount the terminal 200. Consequently, the support 210S carries the majority of any crushing forces that may be applied by the fastener and inhibits damage to the shell 210. Support 210S may also be located and attached to the shell at a location outside of the sealing interface between the first portion 210A and the second portion 210B of shell 210. Further, the components of the shell 210 may have interlocking features between the first portion 210A and the second portion 210B of the shell 210. Specifically, portions of the terminal may have a tongue 210T and groove 210G construction for alignment or sealing of the device. As depicted, support 210S is located outside of the sealing interface of the second portion 210B of shell 210.

Terminals 200 disclosed herein may optionally be weatherproof by appropriately sealing seams of the shell 210 using any suitable means such as gaskets, O-rings, adhesive, sealant, welding, overmolding or the like. To this end, terminal 200 or devices may also comprise a sealing element 290 disposed between the first portion 210A and the second portion 210B of the shell 210. The sealing element 290 may cooperate with shell 210 geometry such as respective grooves 210G or tongues 210T in the shell 210. Grooves or tongue may extend about the perimeter of the shell 210. By way of explanation, grooves 210G may receive one or more appropriately sized O-rings or gaskets 290A for weatherproofing terminal 200, but an adhesive or other material may be used in the groove 210G. By way of example, the O-rings are suitably sized for creating a seal between the portions of the shell 210. By way of example, suitable O-rings may be a compression O-ring for maintaining a weatherproof seal. Other embodiments may use an adhesive or suitable welding of the materials for sealing the device. If welding such as ultra-sonic or induction welding of the shell is used a special sealing element 290 may be used as known in the art. If the terminal 200 is intended for indoor applications, then the weatherproofing may not be required.

As shown in FIG. 13, terminal 200 may comprise a single input optical fiber of the cable input device 100 that is routed to a 1:4 splitter 275 and then each one of the individual optical fibers 92' from the splitter is routed to each of the respective internal connectors 252 of the four connector ports for optical connection and communication within the terminal to external fiber optic connectors that may be attached. Cable input device may be configured in any suitable configuration for the terminals disclosed as desired for the given application. As such, the cable input device may be configured as a single-fiber device or a multi-fiber device.

By way of explanation for multi-fiber ports, two or more optical fibers 92' may be routed from one or more of the plurality of connector ports 260 of the terminal 200 disclosed herein. For instance, two optical fibers may be routed from each of the four connector ports 260 of terminal 200 toward the input connection port 236 with or without a splitter such as single-fiber input connection port 236 using a 1:8 splitter or by using an eight-fiber connection at the input connection port 236 for a 1:1 fiber distribution. To make identification of the connection ports or input connection port(s) easier for the user, a marking indicia may be used such as text or color-coding of the terminal, color codes on the actuator 310A, or marking the input tether (e.g. an orange or green polymer) or the like. Further, terminals may have the input connection port disposed in any suitable location.

FIG. 13 depicts a view of the second portion 210B of shell 210 defining a portion of cavity 216 with the holding device HD for cable input device 100 placed and aligned with the input connection port 236 and the other internal components removed from the shell 210. Shell 210 may have any suitable shape, design or configuration as desired. Second portion 210B cooperates with first portion 210A (i.e., a cover) to form shell 210. Second portion 210B comprises a plurality of connector ports 260 and input connection port 236. Second portion 210B provides a portion of cavity 216 of terminal 200, and the internal bottom surface of second portion 210B may comprises a plurality of alignment features 210AF for aligning one or more the modular adapter sub-assembly 310SA (FIG. 14) with the respective connector ports 260. Alignment features 210AF may have a U-shape and cooperate with the alignment features 255AF on the bottom of adapter body 255. Second portion 210B also includes a plurality of studs 210D on top of the respective connection ports 236 within cavity 216 for seating the hoop 255H of the adapter body 255 for assembly. Second portion 210B may also include a plurality of guide features 210SF for aligning the first portion 210A with the second portion 210B of the shell 210.

The second portion 210B of shell 210 may include other features. The shell 210 may comprise a keying portion (not visible) in the input connection port 236 and/or in the connector port 260. For instance, keying portion may be an additive keying portion to the primitive geometric round shape of the connection port passageway 233 such as a male key that is disposed forward of the securing feature in the connection port passageway 233. However, the concepts for the connection ports 236 of devices may be modified for different housings 20 of the cable input device 100 and/or the connector designs. For instance, the keying portion may be defined as a walled-portion across part of the connection port passageway so that the input connection port 236 or connector port 260 with the keying portion would be able to properly receive a housing 20 or an external fiber optic connector having a portion with a proper D-shaped portion.

As shown in FIG. 13 the second portion 210B of shell 210 may comprise structure on the front end 212 that cooperates with mounting tab 298 for aligning and attaching the same to the shell 210 of the terminal 200. In other embodiments, the mounting tab could be integrally formed with the shell 210, but that requires a more complex molding process.

As shown, the connector ports of the terminal 200 may comprise a marking indicia such as an embossed number or text, but other marking indicia are also possible. For instance, the marking indicia may be on the securing feature 310 such as text on the sliding actuator or the sliding actuator(s) may be color-coded to indicate fiber count, input or output for the associated connection port or input port.

FIG. 14 shows an assembled view of the modular adapter sub-assembly 310SA for the connector ports 260 depicted in FIG. 13. Modular adapter sub-assemblies 310SA enable quick and easy assembly of terminals 200 in a scalable manner. Moreover, the modular sub-assemblies 230SA advantageously allow the mating components (i.e., the adapters 230A) corresponding to each connection port 236 to move or "float" independently of other the other modular adapter sub-assemblies 310SA relative to the shell 210 for preserving optical performance.

FIG. 14 also depicts the rear connector 252 (internal connector of the terminal 200) attached to adapter 230A in addition to modular adapter sub-assembly 310SA with a rear connector 252. FIG. 15 depicts an exploded view of the modular adapter sub-assembly 310SA and shows that the rear connector 252 is not a portion of modular adapter sub-assembly 310SA. Modular adapter sub-assemblies 310SA comprises an adapter 230A aligned with the at least one connector port 260 when assembled. Adapter 230 may be biased by a resilient member 230RM.

As best shown in FIG. 15, modular adapter sub-assembly 310SA comprises a portion of securing feature 310 and a securing feature resilient member 310RM. Specifically, modular adapter sub-assembly 310SA comprises securing member 310M. However, other embodiments could also comprise an actuator 310A as part of the assembly. Securing member 310M is inserted into a front end of an adapter body 255 along with securing feature resilient member 310RM. Specifically, the rim or upper portion of securing member 310M is inserted into a hoop 255H of adapter body 255 and standoffs 310S0 are disposed in a portion of the resilient member pocket 255SP at the bottom of the adapter body 255. Securing feature resilient member 310RM is disposed in the resilient member pocket 255SP for biasing the securing member 310M to a retain position (i.e., upward) as shown in FIG. 14. This construction advantageously keeps the assembly intact using the securing feature resilient member 310RM. Standoffs 310SO of adapter body 255 may also act as stops to limit the translation of the securing member 310.

In this embodiment, modular adapter sub-assembly 310SA may comprises an adapter body 255, securing member 310M, securing feature resilient member 310RM, a ferrule sleeve 230FS, a ferrule sleeve retainer 230R, resilient member 230RM, a retainer along with the adapter 230A. Adapter body 255 has a portion of the connection port passageway 233 disposed therein.

As best depicted in FIG. 15, the is resilient member 230RM is assembled so that is disposed over a barrel of adapter 230A and seated on the flange of adapter 230A, then retainer 240 can be attached to adapter body 255 using latch arms 240LA to secure the same. Ferrule sleeve retainer 230R and ferrule sleeve 230FS are aligned for assembly into the adapter 230A for assembly as shown and seated using the ferrule sleeve retainer 230R. Of course, other variations of the modular adapter sub-assembly 310SA are possible.

The modular sub-assemblies 310SA for the connector ports 260 may be assembled into the second portion 210B of shell 200 as depicted by FIG. 13. As shown, modular adapter sub-assemblies 310AS are aligned and installed onto the U-shaped alignment features 210AF of the second portion 210B of shell 210. Specifically, the alignment features 210AF of the second portion 210B of shell 210 cooperating with the alignment features 255AF on the bottom of adapter body 255 (FIG. 15) to align the same with the connector ports 260. Further, the hoops 255H of the adapter bodies 255 disposed about the plurality of studs 210D on top of the respective connector ports 260 within cavity 216 for aligning the modular adapter sub-assembly 310SA within the second portion 210B of shell 210 for aligning the connection port passageway 233 of the adapter body 255 with the connection port passageway 233 of the shell 210.

First portion 210A of shell 210 may also comprises alignment features sized and shaped for cooperating with the alignment features on the top of adapter body 255 for securing the same when the terminal is assembled. The respective alignment features only allow assembly of the modular adapter sub-assemblies 310SA into the shell 210 in one orientation for the correct orientation of the locking feature 310L with respect to the connection port 236.

The sealing member is sized for the perimeter of the actuator for sealing the securing feature passageway 245. Actuator 310A may also include a stop surface that is larger than the opening in the shell 210 and retains the actuator 310A within the securing feature passageway 245 when assembled and inhibits the actuator from being removed from the terminal 200 when assembled.

Actuator 310A may also be a different color or have a marking indicia for identifying the port type. For instance, the actuator 310A may have a first color for connector ports 260 and a second color for pass-through ports, multi-fiber ports or ports for split signals. Other marking indicia schemes may be used as desired.

When external connectors are inserted as depicted in FIGS. 10-12, locking feature of the external connectors are disposed within bore 310B of securing member 310M. As shown in FIGS. 10-12, locking feature 310L is configured as ramp 310RP that runs to a short flat portion, then to a ledge for creating the retention surface 31ORS for engaging and retaining the external connector (or housing 20) once it is fully inserted into the connector port passageway of the connector port 260. Consequently, the securing feature 310 is capable of moving to an open position (OP) when inserting a suitable connector 10 into the connector port passageway 233 since the connector housing 20 engages the ramp 310RP pushing the securing feature downward during insertion. However, other locking features may be used with the concepts disclosed herein.

Securing member 310M may also comprises standoffs 310 as best shown in FIG. 11. Standoffs 310 SO cooperate with the resilient member pocket 255SP of the adapter body 255 for keeping the bore 310B in the proper rotational orientation within the respective to the adapter body 255. Specifically, standoffs 310 have curved shapes that only allow the securing member 310M to fully-seat into the adapter body 255 when oriented in the proper orientation.

As best shown in FIG. 15, adapter body 255 comprises an adapter body bore 255B that comprises a portion of the connection port passageway 233 when assembled. As discussed, adapter body 255 comprises alignment features 255AF on the bottom of adapter body 255 that cooperate with the shell 210 to align and seat the same in the shell 210. Adapter body 255 also comprises hoop 255H. Hoop 255H captures a portion of the securing member 310M when assembled, and also seats the adapter body 255 in the second portion 210B of shell 210 during assembly. Adapter body 255 also comprises alignment features 255AFT on the top of adapter body 255 for securing the same in the first portion 210A of the shell 210 when the terminal 200 is assembled. Adapter body 255 also comprise resilient member pocket 255SP at the bottom of the adapter body 255 for capturing the securing feature resilient member 310RM as depicted in FIG. 14.

Adapter 230A comprises a plurality of resilient arms 230RA comprising securing features (not numbered). Adapter 230A also comprises an adapter key 230K for orientating the adapter 230A with the adapter body 255. Securing features 230SF cooperate with protrusions on the housing of rear connector 252 for retaining the rear connector 252 to the adapter 230A. The ferrule 252F is disposed within the ferrule sleeve 230FS when assembled. Ferrule sleeves 230FS are used for precision alignment of mating ferrules between internal connectors 252 and the external connectors. Adapters 230A are secured to an adapter body 255 using retainer 240. Adapters 230A may be biased using a resilient member 230RM as shown. Rear connectors 252 may take any suitable form and be aligned for mating with the connector secured with the connection ports 236 in any suitable manner. Devices may use alternative rear connectors if desired and can have different structures for supporting different rear connectors.

The concepts disclosed allow relatively small terminals 200 having a relatively high-density of connections along with an organized arrangement for connectors 10 attached to the terminals 200. Shells have a given height H, width W and length L that define a volume for the terminal as depicted in FIG. 2. By way of example, shells 210 of terminal 200 may define a volume of 800 cubic centimeters or less, other embodiments of shells 210 may define the volume of 400 cubic centimeters or less, other embodiments of shells 210 may define the volume of 100 cubic centimeters or less as desired. Some embodiments of terminals 200 comprise a connection port insert 230 having a port width density of at least one connection port 236 per 20 millimeters of width W of the terminal 200. Other port width densities are possible such as 15 millimeters of width W of the terminal. Likewise, embodiments of terminals 200 may comprise a given density per volume of the shell 210 as desired.

The concepts disclosed allow relatively small form-factors for multiports as shown in Table 1. Table 1 below compares representative dimensions, volumes, and normalized volume ratios with respect to the prior art of the shells (i.e., the housings) for multiports having 4, 8 and 12 ports as examples of how compact the multiports of the present application are with respect to convention prior art multiports. Specifically, Table 1 compares examples of the conventional prior art multiports such as depicted in FIG. 1 with multiports having a linear array of ports. As depicted, the respective volumes of the conventional prior art multiports of FIG. 1 with the same port count are on the order of ten times larger than multiports with the same port count as disclosed herein. By way of example and not limitation, the multiport may define a volume of 400 cubic centimeters or less for 12-ports, or even if double the size could define a volume of 800 cubic centimeters or less for 12-ports. Multiports with smaller port counts such as 4-ports could be even smaller such as the shell or multiport defining a volume of 200 cubic centimeters or less for 4-ports, or even if double the size could define a volume of 200 cubic centimeters or less for 4-ports. Devices with sizes that are different will have different volumes form the explanatory examples in Table 1 and these other variations are within the scope of the disclosure. Consequently, it is apparent the size (e.g., volume) of multiports of the present application are much smaller than the conventional prior art multiports of FIG. 1. In addition to being significantly smaller, the multiports of the present application do not have the issues of the conventional prior art multiports depicted in FIG. 2. Of course, the examples of Table 1 are for comparison purposes and other sizes and variations of multiports may use the concepts disclosed herein as desired.

One of the reasons that the size of the multiports may be reduced in size with the concepts disclosed herein is that the cable input device and/or external connectors that cooperate with the multiports have locking features that are integrated into the housing 20 of the cable input device 100 or the external connectors 10. In other words, the locking features for holding the cable input device in the input connection port 236 are integrally formed in the housing, instead of being a distinct and separate component.

Likewise, the external connectors 400 may also have a locking feature integrally formed into the housing of the external connector, thereby avoiding bulky structures such as a coupling nut or bayonet used with conventional hardened external connectors and multiports. In other words, conventional external connectors for multiports have threaded connections or bayonets that require finger access for connection and disconnecting. By eliminating the threaded coupling nut or bayonets (which is a separate component that must rotate about the connector) the spacing between conventional connectors may be greatly reduced. Also eliminating the dedicated coupling nut from the conventional connectors also allows the footprint of the connectors to be smaller, which also aids in reducing the size of the multiports disclosed herein.

TABLE 1

Comparison of Conventional Multiport of FIG. 1 with Multiports of Present Application

| Multiport Type | Port Count | Dimension L × W × H (mm) | Volume (cm³) | Normalized Volume Ratio |
|---|---|---|---|---|
| Prior Art | 4 | 274 × 66 × 73 | 1320 | 1.0 |
| FIG. 1 | 8 | 312 × 76 × 86 | 2039 | 1.0 |
|  | 12 | 381 × 101 × 147 | 5657 | 1.0 |
| Linear | 4 | 76 × 59 × 30 | 134 | 0.10 |
|  | 8 | 123 × 109 × 30 | 402 | 0.20 |
|  | 12 | 159 × 159 × 30 | 758 | 0.14 |

Methods for attaching a portion of a cable input device to a terminal for forming an assembly are also disclosed herein. The methods disclosed comprise inserting a portion of the housing of the cable input device into a port opening so that housing enters the bore of the securing member of the terminal. The locking feature 20L of the housing 20 cooperates with the securing member to hold the housing of the cable input device within the at least one connection port with a portion of the optical fiber of the cable input device disposed within the cavity of the terminal 200. Some embodiments may include the securing member 310M that cooperates with the locking feature 20L of the housing. The methods may further comprise the securing member 310M comprising a bore with a locking feature 310L. The locking feature may further comprise a ramp with a ledge.

The methods may further comprise at least one securing feature 310M translating from a retain position RP to an open position OP as the housing 20 is fully seated into the at least one connection port 236.

The method may further comprise the securing member 310M not capable of being actuated to release the housing 20 after being inserted to hold the housing 20 within the input connection port.

Although the disclosure has been illustrated and described herein with reference to explanatory embodiments and specific examples thereof, it will be readily apparent to those of ordinary skill in the art that other embodiments and examples can perform similar functions and/or achieve like results. For instance, the connection port insert may be configured as individual sleeves that are inserted into a passageway of a device, thereby allowing the selection of different configurations of connector ports for a device to tailor the device to the desired external connector. All such equivalent embodiments and examples are within the spirit and scope of the disclosure and are intended to be covered by the appended claims. It will also be apparent to those skilled in the art that various modifications and variations can be made to the concepts disclosed without departing from the spirit and scope of the same. Thus, it is intended that the present application cover the modifications and variations provided they come within the scope of the appended claims and their equivalents.

We claim:

1. A cable input device for being received into an input port, the cable input device comprising:
   at least one optical fiber;
   a jacket comprising a longitudinal passageway, wherein a portion of the at least one optical fiber is disposed in the longitudinal passageway of the jacket; and
   a housing comprising an outer surface having a locking feature integrally formed in the outer surface, a rear opening, a front opening and a passageway from the rear opening to the front opening, wherein a portion of the at least one optical fiber passes through the passageway and extends beyond the front opening of the housing, the housing further comprises a keying portion comprising a female key.

2. The cable input device of claim 1, wherein the locking feature is disposed about 180 degrees from the keying portion or the female key on the outer surface of the housing.

3. The cable input device of claim 1, wherein the locking feature is disposed less than 180 degrees from the keying portion or the female key on the outer surface of the housing.

4. The cable input device of claim 1, further comprising an O-ring disposed on the housing.

5. The cable input device of claim 1, wherein the locking feature comprises a notch comprising a ramp with a ledge.

6. The cable input device of claim 1, wherein the locking feature is a notch, a groove, a shoulder or a scallop.

7. The cable input device of claim 1, wherein the jacket further comprises one or more strength members.

8. The cable input device of claim 1, further comprising a heat shrink disposed about a portion of the jacket and a portion of the housing.

9. The cable input device of claim 1, further comprising a tubing having a portion disposed within the jacket.

10. The cable input device of claim 9, further comprising a tubing heat shrink disposed about a portion of the tubing and a portion of the at least one optical fiber.

11. The cable input device of claim 1, wherein the at least one optical fiber comprises a plurality of optical fibers, wherein at least a portion of the plurality of optical fibers is disposed within the tubing.

12. An assembly comprising:
    a cable input device comprising:
        at least one optical fiber;
        a jacket comprising a longitudinal passageway, wherein a portion of the at least one optical fiber is disposed in the longitudinal passageway of the jacket; and
        a housing comprising an outer surface having a locking feature integrally formed in the outer surface, a rear opening, a front opening and a passageway from the rear opening to the front opening, wherein a portion of the at least one optical fiber passes through the passageway and extends beyond the front opening of the housing, and the housing further comprises a keying portion comprising a female key; and a terminal comprising:
    a shell comprising a cavity;
    at least one input connection port comprising a port opening extending from an outer surface of the terminal into the cavity and defining a port passageway along a longitudinal axis; and
    a securing member associated with the port passageway, and wherein the securing member comprises a bore that receives a portion of the housing of the cable input device, and wherein the at least one optical fiber of the cable input device extends into the cavity of the terminal.

13. The assembly of claim 12, wherein the securing member engages the locking feature of the housing.

14. The assembly of claim 12, further comprising at least one securing feature resilient member for biasing the securing member to a retain position.

15. The assembly of claim 12, wherein the securing member is not accessible on the terminal for releasing the housing of the cable input device from the at least one input connection port.

16. The assembly of claim 12, wherein the bore comprises a locking feature for securing the housing.

17. The assembly of claim 12, wherein the locking feature of the housing comprises a ramp with a ledge.

18. The assembly of claim 12, wherein the locking feature comprises a retention surface.

19. The assembly of claim 12, wherein the at least one input connection port is a portion of the shell.

20. The assembly of claim 12, the shell comprises at least a first portion and a second portion.

21. The assembly of claim 12, wherein the terminal is weatherproof.

22. The assembly of claim 12, wherein the at least one optical fiber is optically connected to a fiber optic connector disposed within the cavity of the terminal.

23. The assembly of claim 12, wherein the at least one optical fiber is optically connected to an optical splitter disposed within the cavity of the terminal.

24. The assembly of claim 23, wherein the optical splitter is in optical communication with a plurality of optical fiber legs that are terminated with respective fiber optic connectors disposed within the cavity of the terminal.

25. The assembly of claim 12, wherein the connection port passageway comprising a keying portion.

26. The assembly of claim 25, wherein the keying portion comprises a male key.

27. The assembly of claim 12, wherein the shell defines a volume of 800 cubic centimeters or less.

28. The assembly of claim 12, wherein the multiport has a port width density of at least one connection port per 20 millimeters of width of terminal.

29. The assembly of claim 12, further comprising a sealing element for weatherproofing the shell.

30. A method of attaching a portion of a cable input device to a terminal for forming an assembly, comprising: the cable input device comprising:
   at least one optical fiber;
   a jacket comprising a longitudinal passageway, wherein a portion of the at least one optical fiber is disposed in the longitudinal passageway of the jacket; and
   a housing comprising an outer surface having a locking feature integrally formed in the outer surface, a rear opening, a front opening and a passageway from the rear opening to the front opening, wherein a portion of the at least one optical fiber passes through the passageway and extends beyond the front opening of the housing, the housing further comprises a keying portion comprising a female key; and the terminal comprising:
   a shell comprising a cavity;
   at least one input connection port comprising a port opening extending from an outer surface of the terminal into a cavity of the terminal and defining a port passageway along a longitudinal axis; and
   a securing member associated with the port passageway, and wherein the one securing member comprises a bore; inserting a portion of the housing of the cable input device into the port opening so that housing enters the bore of the securing member, and the locking feature of the housing cooperates with the securing member to hold the housing within the at least one input connection port with a portion of the at least one optical fiber of the cable input device disposed within the cavity of the terminal.

31. The method of claim 30, wherein the at least one securing member further comprises a locking feature that cooperates with the locking feature on the housing.

32. The method of claim 31, wherein the locking feature further comprising a ramp with a ledge.

33. The method of claim 28, further comprising the at least one securing member translating from a retain position to an open position as the housing is fully seated into the at least one input connection port.

34. The method of claim 28, wherein the securing member is not capable of being actuated to release the housing after being inserted to hold the housing within the at least one input connection port.

* * * * *

UNITED STATES PATENT AND TRADEMARK OFFICE
CERTIFICATE OF CORRECTION

PATENT NO. : 11,487,073 B2
APPLICATION NO. : 17/032909
DATED : November 1, 2022
INVENTOR(S) : Radawan Ripumaree et al.

It is certified that error appears in the above-identified patent and that said Letters Patent is hereby corrected as shown below:

On the Title Page

On the page 5, in Column 2, under "Other Publications", Line 1, delete "lopp" and insert -- loop --.

On the page 5, in Column 2, under "Other Publications", Line 3, delete "Ramanilia" and insert -- Ramanitra --.

On the page 5, in Column 2, under "Other Publications", Line 7, delete "Poeceedings" and insert -- Proceedings --.

Signed and Sealed this
Twenty-eighth Day of February, 2023

Katherine Kelly Vidal
*Director of the United States Patent and Trademark Office*